US009125150B2

(12) United States Patent
Takano et al.

(10) Patent No.: US 9,125,150 B2
(45) Date of Patent: Sep. 1, 2015

(54) COMMUNICATION APPARATUS AND AUTOMATIC GAIN CONTROL METHOD

(71) Applicant: SONY CORPORATION, Tokyo (JP)

(72) Inventors: Hiroaki Takano, Saitama (JP); Takushi Kunihiro, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/027,614

(22) Filed: Sep. 16, 2013

(65) Prior Publication Data

US 2014/0016632 A1    Jan. 16, 2014

Related U.S. Application Data

(63) Continuation of application No. 13/203,476, filed as application No. PCT/JP2009/071764 on Dec. 28, 2009, now Pat. No. 8,553,715.

(30) Foreign Application Priority Data

Mar. 2, 2009  (JP) .................................. 2009-048580

(51) Int. Cl.
*H04H 20/67* (2008.01)
*H04W 56/00* (2009.01)
*H04B 7/08* (2006.01)
*H04W 72/04* (2009.01)

(52) U.S. Cl.
CPC ............... *H04W 56/00* (2013.01); *H04B 7/088* (2013.01); *H04W 72/046* (2013.01)

(58) Field of Classification Search
CPC ..... H04W 56/00; H04W 72/046; H04B 7/088
See application file for complete search history.

(56) References Cited

U.S. PATENT DOCUMENTS 6,115,409 A  9/2000 Upadhyay et al.
6,282,218 B1  8/2001 Anderson
(Continued)

FOREIGN PATENT DOCUMENTS

JP  2000-224139  8/2000
JP  2002-152108  5/2002
(Continued)

OTHER PUBLICATIONS

Jan. 8, 2013, Japanese Office Action for related application No. JP 2009-048580.

*Primary Examiner* — Robert Wilson
(74) *Attorney, Agent, or Firm* — Sherr & Jiang, PLLC

(57) ABSTRACT

Provided is a communication apparatus including a first communication unit for performing communication using a carrier having a first frequency, a second communication unit having a plurality of antennas, for performing communication using a carrier having a second frequency, a first communication processing unit for processing a signal received by the first communication unit and causing to transmit a signal, and a second communication processing unit for processing a signal received by the second communication unit and causing to transmit a signal. The second communication processing unit includes a synchronization unit for specifying a start position of a second transmission request in which a plurality of transmission beam patterns are set in one packet based on information indicating reception initiation, and an automatic gain control unit for performing automatic gain control based on a first automatic gain control setting value.

6 Claims, 14 Drawing Sheets

(56) References Cited

U.S. PATENT DOCUMENTS

| | | |
|---|---|---|
| 7,120,468 B1 | 10/2006 | Wilhoyte et al. |
| 7,916,081 B2 | 3/2011 | Lakkis |
| 8,059,701 B2 | 11/2011 | Tung |
| 8,553,715 B2 * | 10/2013 | Takano et al. .................. 370/465 |
| 2005/0141459 A1 | 6/2005 | Li et al. |
| 2006/0234663 A1 | 10/2006 | Wilhoyte et al. |
| 2009/0160707 A1 | 6/2009 | Lakkis |
| 2011/0310883 A1 * | 12/2011 | Takano et al. .................. 370/350 |
| 2012/0122392 A1 * | 5/2012 | Morioka et al. ................ 455/25 |
| 2012/0213300 A1 | 8/2012 | Yamaura |
| 2012/0263158 A1 | 10/2012 | Lee et al. |
| 2012/0303363 A1 | 11/2012 | Sorensen |
| 2012/0324315 A1 | 12/2012 | Zhang et al. |
| 2012/0327871 A1 | 12/2012 | Ghosh et al. |

FOREIGN PATENT DOCUMENTS

| | | |
|---|---|---|
| JP | 2003-244054 | 8/2003 |
| JP | 2005-244475 | 9/2005 |
| JP | 2008-245256 | 10/2008 |
| WO | WO2008/069245 | 6/2008 |

* cited by examiner

FIG. 10

| BRANCH (GROUP) | BRANCH 0 (GROUP 0) | BRANCH 1 (GROUP 1) | BRANCH 2 (GROUP 2) | SELECTED BRANCH (GROUP) |
|---|---|---|---|---|
| SERVING RANGE | From 0dBm To -30dBm | From -30dBm To -60dBm | From -60dBm To -90dBm | |
| CASE 1 | 200 | 511 | 511 | 0 |
| CASE 2 | 0 | 200 | 511 | 1 |
| CASE 3 | 0 | 0 | 200 | 2 |

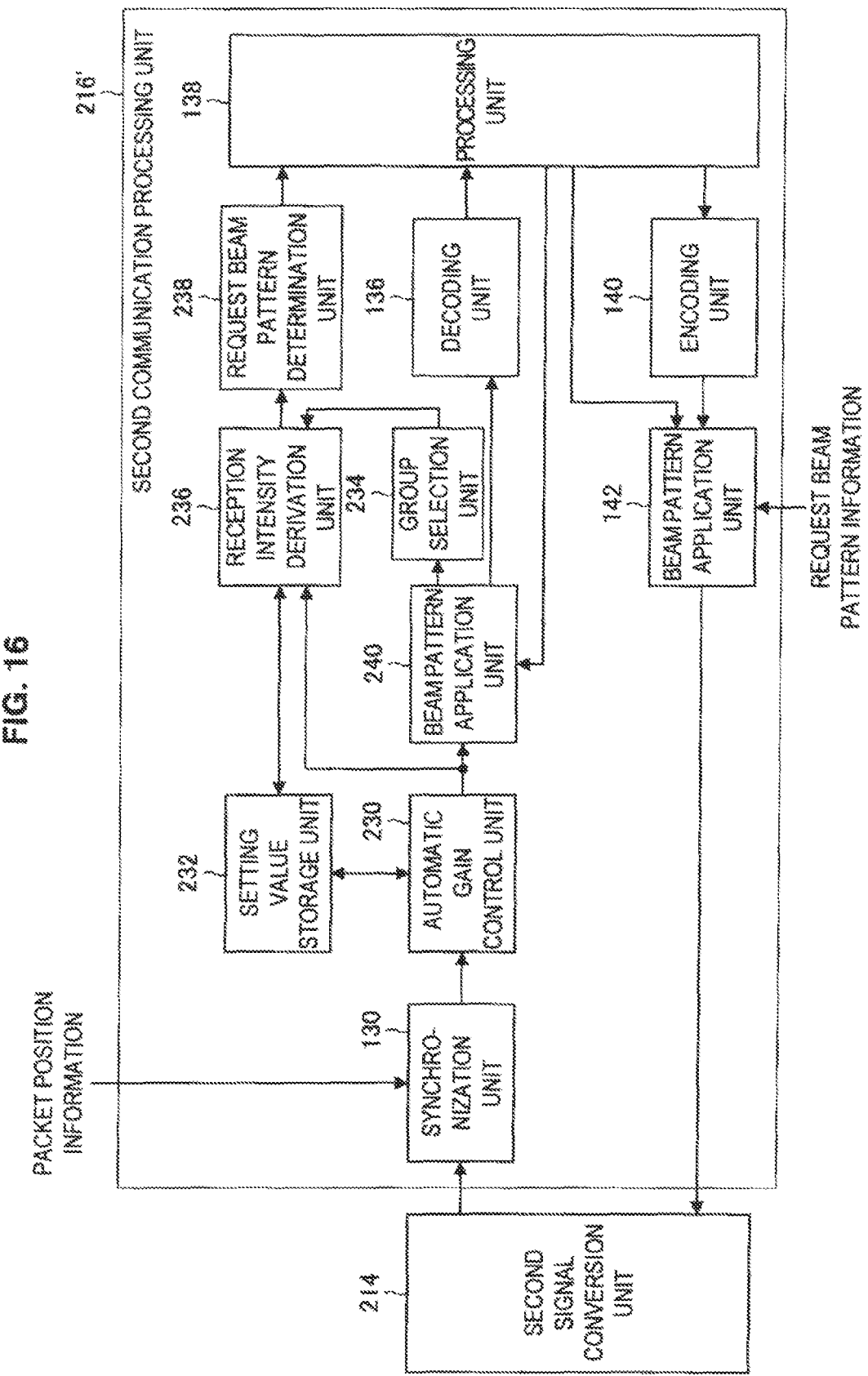

COMMUNICATION APPARATUS AND AUTOMATIC GAIN CONTROL METHOD

CROSS REFERENCE TO PRIOR APPLICATION

This application is a continuation of U.S. patent application Ser. No. 13/203,476 (filed on Aug. 25, 2011), which is a National Stage Patent Application of PCT International Patent Application No. PCT/JP2009/071764 (filed on Dec. 28, 2009) under 35 U.S.C. §371, which claims priority to Japanese Patent Application No. 2009-048580 (filed on Mar. 2, 2009), which are all hereby incorporated by reference in their entirety.

TECHNICAL FIELD

The present invention relates to a communication apparatus and an automatic gain control method.

BACKGROUND ART

In recent years, for example, various apparatuses such as computers, e.g., a notebook PC (Personal Computer), or television receivers have more functions and apparatuses having a function of enabling wireless communication with other apparatuses have become widespread. Here, wireless communication between such apparatuses is performed, for example, using a carrier (electromagnetic waves) having a predetermined frequency, seen as a 5 GHz band.

Meanwhile, in recent years, technology for increasing a communication speed of wireless communication using a carrier having a higher frequency than a millimeter wave has been developed. Here, the millimeter wave refers to, for example, a carrier having a wavelength of 10 mm to 1 mm and a frequency of 30 GHz to 300 GHz. Accordingly, for example, when a millimeter wave such as a 60 GHz band carrier is used for communication, channels can be allocated in units of GHz such that the communication speed can be higher compared to the case in which a 5 GHz band earner is used for communication.

In general, a millimeter wave such as the 60 GHz hand carrier has a characteristic in that the millimeter wave has a stronger directivity or a greater attenuation resulting from reflection than the 5 GHz band carrier. Thereby, communication using the millimeter wave such as the 60 GHz band carrier is mainly performed using a direct wave or a once-reflected wave. The millimeter wave such as the 60 GHz hand carrier has a further characteristic in that the millimeter wave has a higher free space propagation loss than the 5 GHz band carrier. Accordingly, in general, the communication using the millimeter wave has a shorter communication distance than communication using the 5 GHz band carrier.

Meanwhile, technology related to communication using a carrier having directivity has been developed. Technology of providing three or more antennas having different set directivities and selectively processing any signal received by each antenna may include, for example, Patent Literature 1.

CITATION LIST

Patent Literature

Patent Literature 1: Japanese Patent Application Laid-open Publication No. 2000-224139

SUMMARY OF INVENTION

Technical Problem

In the conventional technology of providing three or more antennas having different set directivities and selectively processing any signal received by each antenna (hereinafter, referred to as "conventional technology"), an AGC (Automatic Gain Control) circuit is included for each antenna.

When a communication apparatus includes an AGC circuit, the communication apparatus generally performs, for example, automatic gain control at a head of a packet (data). The communication apparatus performs the automatic gain control of the packet using an automatic gain control setting value (hereinafter, referred to as "AGC setting value") set by the automatic gain control to the end. Accordingly, when a packet having single directivity is processed, the communication apparatus may perform the automatic gain control normally.

However, a signal received by the communication apparatus does not necessarily have the single directivity. For example, the communication apparatus may receive a transmitted signal in which a plurality of directivity patterns are set in one packet by an external apparatus. Here, when a plurality of directivity patterns are set in one packet, reception powers in the communication apparatus may differ, for example, by tens of [db] due to set directivities. In the above case, since a dynamic range of the received signal is very great, the communication apparatus using the AGC setting value obtained in a head of the packet up to an end of the packet is limited. That is, in the above case, the communication apparatus cannot perform the automatic gain control normally on a received signal and, for example, the communication apparatus cannot process the received signal normally, such that data outside the measurement range can be generated.

Here, in the conventional technology, an AGC circuit is included for each antenna, but issues that may occur when a signal in which a plurality of directivity patterns are set in one packet is processed is not considered. That is, in a communication apparatus to which the conventional technology has been applied (hereinafter, referred to as a "conventional communication apparatus"), issues may occur when the signal in which a plurality of directivity patterns are set in the one packet is processed. Accordingly, even when the conventional technology is used, the communication apparatus may not process a received signal normally.

The present disclosure is made in view of the above-mentioned problem and an object of the present invention is to provide a communication apparatus and an automatic gain control method which are novel and improved and which are capable of processing a packet having a wide dynamic range in communication using directivity of antennas.

Solution to Problem

According to the first aspect of the present invention in order to achieve the above-mentioned object, there is provided a communication apparatus including: a first communication unit for performing wireless communication with an external apparatus using a carrier having a first frequency; a second communication unit having a plurality of antennas, for performing wireless communication with an external apparatus using a carrier having a second frequency having a stronger directivity and a higher propagation loss than the carrier having the first frequency; a first communication processing unit, for processing a signal received by the first communication unit and causing the first communication unit to transmit a signal; and a second communication processing unit for processing a signal received by the second communication unit and causing the second communication unit to transmit a signal, wherein the second communication processing unit includes a synchronization unit for specifying a start position of a second transmission request in which a plurality of transmission beam patterns are set in one packet, on the basis of information indicating reception initiation delivered from the first communication processing unit based on a first transmission request received by the first communication unit, the second transmission request being received by the second communication unit; and an automatic gain control unit for performing automatic gain control on each transmission beam pattern based on a first automatic gain control setting value corresponding to each transmission beam pattern, the first automatic gain control setting value being included in the second transmission request specified by the synchronization unit.

According to such a configuration, it is possible to process a packet having a wide dynamic range in communication using directivity of an antenna.

Further, the communication apparatus may further include a reception intensity derivation unit for deriving reception intensity for each transmission beam pattern based on the second transmission request output from the automatic gain control unit; and a requested beam pattern determining unit for determining a requested beam pattern to be transmitted to an external apparatus having transmitted the second transmission request from among the plurality of transmission beam patterns set in the second transmission request, based on a derivation result from the reception intensity derivation unit.

Further, the communication apparatus may further include a setting value storage unit for storing a second automatic gain control setting value corresponding to the requested beam pattern based on a first automatic gain control setting value corresponding to the requested beam pattern, wherein the automatic gain control unit may perform automatic gain control based on the second automatic gain control value when the second transmission request is not specified by the synchronization unit.

Further, the automatic gain control unit may perform the automatic gain control using the first automatic gain control setting value or the second automatic gain control setting value as a fixed value or an initial value.

Further, the setting value storage unit may store the second automatic gain control setting value having a higher set gain than the first automatic gain control setting value corresponding to the requested beam pattern.

Further, the setting value storage unit may store the first automatic gain control setting value corresponding to the requested beam pattern as the second automatic gain control setting value.

Further, a predetermined no signal period may be set between the respective transmission beam patterns among the plurality of transmission beam patterns set in the second transmission request.

Further, the communication apparatus may further include a processing unit for causing to transmit requested beam pattern identification information indicating the requested beam pattern to the external apparatus having transmitted the second transmission request via the first communication processing unit.

According to the second aspect of the present invention in order to achieve the above-mentioned object, there is provided a communication apparatus including: a first communication unit for performing wireless communication with an external apparatus using a carrier having a first frequency; a second communication unit having a plurality of antennas divided into a plurality of groups, for performing wireless communication with an external apparatus using a carrier having a second frequency having a stronger directivity and a higher propagation loss than the carrier having the first frequency; a first communication processing unit for processing a signal received by the first communication unit and causing the first communication unit to transmit a signal; and a second communication processing unit for processing a signal received by the second communication unit and causing the second communication unit to transmit a signal, wherein the second communication processing unit includes a synchronization unit for specifying a start position of a second transmission request in which a plurality of transmission beam patterns are set in one packet, on the basis of information indicating reception initiation delivered from the first communication processing unit based on a first transmission request received by the first communication unit, the second transmission request being received by the second communication unit; and an automatic gain control unit for performing, for each group, automatic gain control on the transmission beam pattern set in each second transmission request received for each group based on a third different automatic gain control setting value set for each group.

According to such a configuration, it is possible to process a packet having a wide dynamic range in communication using directivities of the antennas.

Further, the communication apparatus may further include a group selection unit for selecting one group based on the second transmission request for each group output from the automatic gain control unit; a reception intensity derivation unit for deriving reception intensity for each transmission beam pattern based on the second transmission request corresponding to the group selected by the group selection unit, the second transmission request being output from the automatic gain control unit; and a requested beam pattern determining unit for determining a requested beam pattern to be transmitted to an external apparatus having transmitted the second transmission request from among the plurality of transmission beam patterns set in the second transmission request based on a derivation result from the reception intensity derivation unit.

According to the third aspect of the present invention in order to achieve the above-mentioned object, there is provided an automatic gain control method including the step of specifying a position of a predetermined packet based on a first transmission request transmitted from an external apparatus using a carrier having a first frequency; specifying a start position of a second transmission request in which a plurality of transmission beam patterns defining beam-shaped directivity of a signal to be transmitted are set in one packet based on the specified position of the predetermined packet, the second transmission request being transmitted from the external apparatus using a carrier having a second frequency having a stronger directivity and a higher propagation loss than the carrier having the first frequency; and performing automatic gain control for each transmission beam pattern based on an automatic gain control setting value corresponding to each transmission beam pattern, the automatic gain control setting value being included in the specified second transmission request.

It is possible to process a packet having a wide dynamic range in communication using directivity of the antennas using such a method.

Advantageous Effects of Invention

According to the present invention it is possible to process a packet having a wide dynamic range in communication using directivity of antennas.

BRIEF DESCRIPTION OF DRAWINGS

FIG. 10 is an illustrative diagram illustrating an example of a group selection, process according to an embodiment of the present invention.

FIG. 16 is an illustrative diagram showing an example of a configuration of a second communication processing unit according to a modified example of the second embodiment of the present invention.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, hereinafter, a description will be given in the following order.

1. Approach according to Embodiment of the Present Invention

2. Communication Apparatus according to First Embodiment of the Present Invention 3. Communication Apparatus according to Second Embodiment of the Present invention (Approach According to Embodiment of the Present Invention)

An automatic gain control approach for processing a packet having a wide dynamic range according to an embodiment of the present invention will be described prior to explanation of a configuration of a communication apparatus according to an embodiment of the present invention.

[Overview of Communication System according to Embodiment of the Present Invention]

Figure 1:
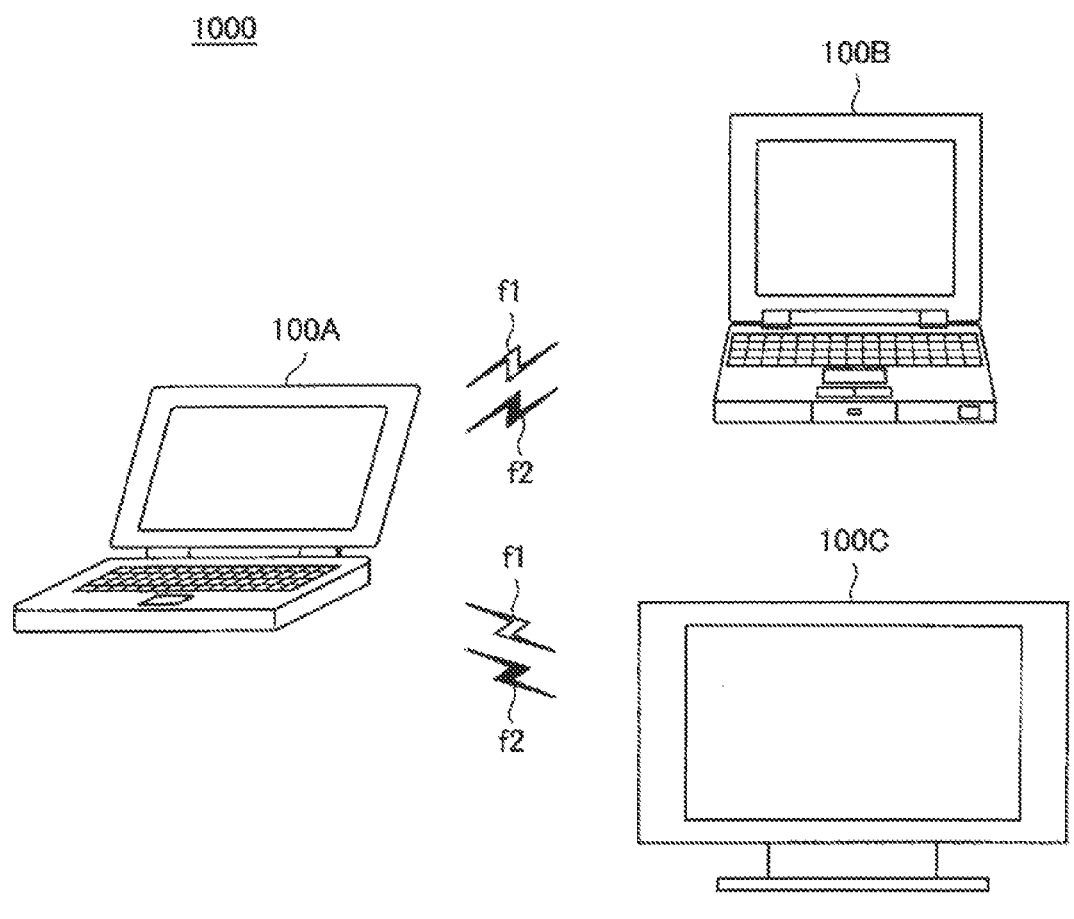
FIG. 1 is an illustrative diagram showing an example of a communication system according to an embodiment of the present invention.

FIG. 1 is an illustrative diagram showing an example of a communication system 1000 according to an embodiment of the present invention. Here, in FIG. 1, an example in which the communication system 1000 includes communication apparatuses 100A, 100B, 100C, . . . , and the communication apparatus 100A and the communication apparatus 100B, and the communication apparatus 100A and the communication apparatus 100C perform communications, respectively is shown. In FIG. 1, an example in which the communication apparatuses 100A and 100B are notebook PCs and the communication apparatus 100C is a television receiver is also shown. However, the communication apparatus according to an embodiment of the present invention is not limited to the notebook PC or the television receiver. Hereinafter, the communication apparatuses 100A, 100B, 100C, . . . constituting the communication system 1000 according to an embodiment of the present invention may be collectively referred to as a "communication apparatus 100."

The communication apparatus 100 communicates with an external apparatus using two carriers: a carrier f1 having a first frequency; and a carrier f2 having a second frequency and having a stronger directivity and a higher propagation loss than the carrier f1 having the first frequency. Here, the carrier having the first frequency according to an embodiment of the present invention includes, for example, a carrier whose frequency widely used for data communication such as a wireless LAN (Local Area Network) is a 5 GHz band, but the present invention is not limited thereto. Further, the carrier having the second frequency according to an embodiment of the present invention, includes, for example, millimeter waves (or quasi-millimeter waves), but the present invention is not limited thereto.

Hereinafter, a case in which the communication apparatus 100 uses a 5 GHz carrier as the carrier f1 having the first frequency and a 60 GHz carrier as the carrier f2 having the second frequency will be described by way of example. That is, hereinafter, a case in which communication using the carrier f2 having the second frequency is faster than communication using the carrier f1 having the first frequency will be illustrated. A communication method according to an embodiment of the present invention to be described below may also be applied, for example, to a case in which the communication using the carrier f2 having the second frequency is not faster than the communication using the carrier f1 having the first frequency.

[Communication Method in Communication System 1000]

The 60 GHz carrier f2 (the carrier having the second frequency) used for communication by each communication apparatus 100 in the communication system 1000 has a stronger directivity and a higher propagation loss than a 5 GHz carrier f1 (the carrier having the first frequency). Accordingly, there is a merit in that use of the carrier f2 having the second frequency for communication can realize faster communication than use of the carrier f1 having the first frequency for communication, but there is a demerit in that the communication using the carrier f2 having the second frequency has a smaller communication distance than the communication using the carrier f1 having the first frequency.

Here, the communication apparatus 100 performs transmission of the carrier f2 having the second frequency using directivity of an antenna. Since the carrier f2 having the second frequency can be transmitted in a specific direction by perforating the transmission of the carrier f2 having the second frequency using the directivity of the antenna, the communication apparatus 100 can further increase a communication distance of the communication using the carrier f2 having the second frequency.

Here, the communication apparatus 100 includes, for example, a plurality of antennas to create beam-shaped directivity, thereby increasing the communication distance of the communication using the carrier f2 having the second frequency. This is because use of a direct wave is more effective than use of a reflected wave in communication stability, for example, due to a characteristic that the directivity is strong when a frequency of the carrier f1 having the second frequency is 60 GHz. Hereinafter, a beam-shaped directivity pattern according to an embodiment of the present invention is referred to as a "beam pattern."

Methods of creating directivity using a plurality of antennas may include, for example, a method of creating a beam with an array antenna, such as a method of determining a weight with a uniform distribution or a method of determining a weight with a Tayler distribution, but the present invention is not limited thereto.

When a signal is transmitted using the carrier f2 having the second frequency, a signal transmitted by the communication apparatus 100 at a transmission side (hereinafter, referred to as "transmission apparatus") is not necessarily received by the communication apparatus 100 at a receiving side (hereinafter, referred to as "reception apparatus") normally. This is because, when a beam pattern applied to the signal transmitted by the transmission apparatus is not suitable for communication with the reception apparatus (e.g., when the transmitted signal is not directed to the reception apparatus), the reception apparatus may not receive the transmitted signal. Hereinafter, the beam pattern applied to the signal transmitted by the transmission apparatus (or a signal to which the beam pattern is applied) may be referred to as a "transmission beam pattern."

Accordingly, when a signal is transmitted by the carrier f2 having the second frequency, communication between the communication apparatuses cannot be performed in the communication system 1000, for example, until the signal transmitted by the transmission apparatus (a signal to which the transmission beam pattern is applied) is directed to a reception apparatus as a communication target. That is, when the signal is transmitted by the carrier f2 having the second frequency, much time may be necessary until the transmission apparatus and the reception apparatus, which is a communication target, can communicate with each other.

Here, the communication system 1000 realizes more reliable data transmission and reception using the carrier f2 having the second frequency by performing, for example, communications (a) to (c) (communication processes) between the transmission apparatus (one communication apparatus 100) and the reception apparatus (the other communication apparatus 100).

(a) The transmission apparatus transmits, to the reception apparatus, information of a plurality of transmission beam patterns capable of being applied to a signal to be transmitted.

(b) The reception apparatus determines a beam pattern to be transmitted (hereinafter, "requested beam pattern") from among the plurality of transmission beam patterns. The reception apparatus transmits information indicating the requested beam pattern (hereinafter referred to as "requested beam pattern identification information") to the transmission apparatus.

(c) The transmission apparatus transmits data with a carrier f2 having a second frequency to which a transmission beam pattern corresponding to the requested beam pattern has been applied, based on the received requested beam pattern identification information.

According to the communications, (a) to (c), the reception apparatus receives data transmitted from the transmission apparatus with the carrier f2 having the second frequency to which the transmission beam pattern requested by the reception apparatus has been applied. Accordingly, the reception apparatus (one communication apparatus 100) may more reliably receive data transmitted by the carrier f2 having the second frequency from the transmission apparatus (the other communication apparatus 100).

Further, for example, when the transmission apparatus transmits a signal with the carrier f2 having the second frequency, packet synchronization may not be performed since a signal received by the reception apparatus is small. In the above case, the reception apparatus may not specify the information of the plurality of transmission beam patterns transmitted by the transmission apparatus in (a). Accordingly, in the above case, the reception apparatus may not perform the determination of the requested beam pattern according to (b) based on the information of the plurality of transmission beam patterns transmitted by the carrier f2 having the second frequency.

Here, in the communication system 1000, the transmission apparatus transmits the signal by the carrier f1 having a first frequency and the signal by the carrier f2 having the second frequency in synchronization with each other. Here, the synchronized transmission refers to, for example, making a start position of a predetermined packet of the signal by the carrier f1 having the first frequency coincident with a start position of a predetermined packet of the signal by the carrier f2 having the second frequency and transmitting the signals.

This enables the reception apparatus to specify the start position of the predetermined packet of the signal by the carrier f1 having a second frequency based on the result of receiving the signal by the carrier f1 having the first frequency. Accordingly, the reception apparatus may perform the determination of the requested beam pattern according to (b) based on the signal by the carrier f2 having the second frequency transmitted in synchronization with the signal by the carrier f1 having the first frequency.

Figure 2:
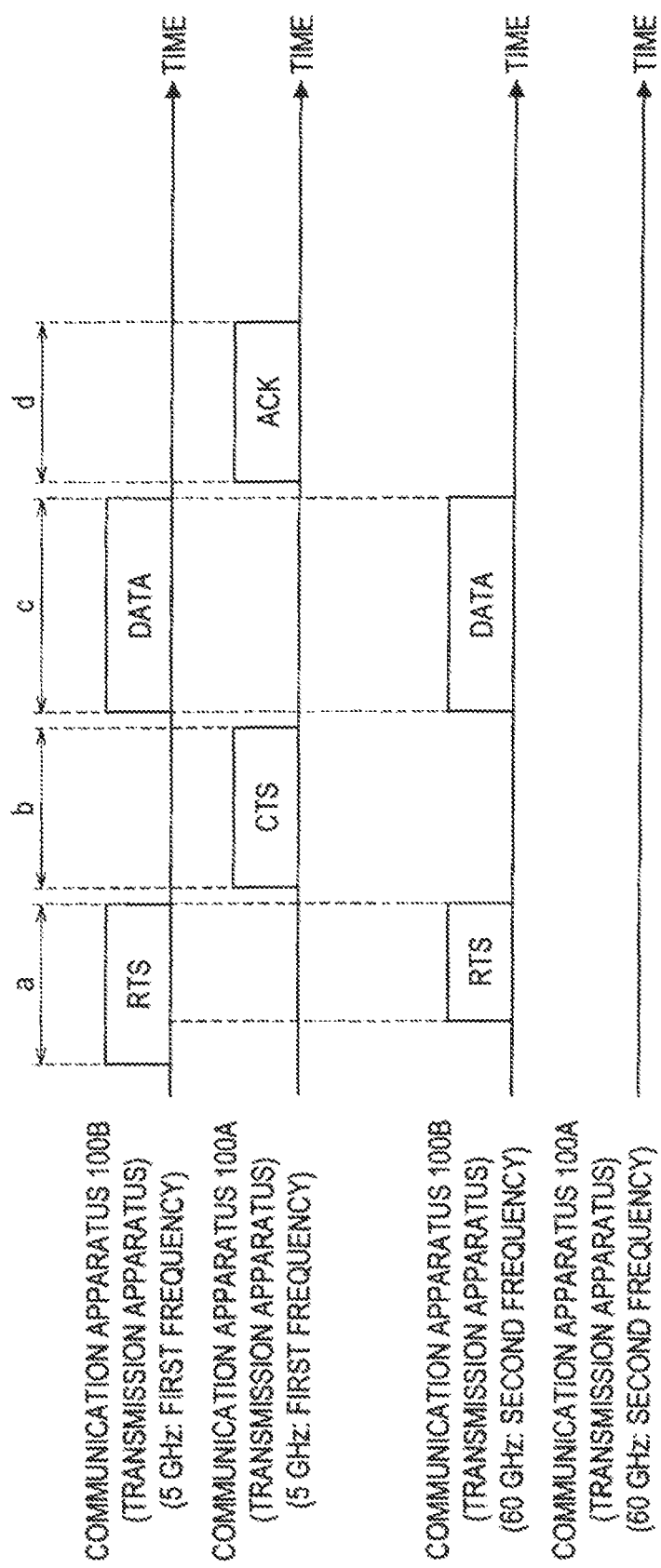
FIG. 2 is an illustrative diagram showing an example of a communication process in the communication system according to an embodiment of the present invention.

A communication process according to an embodiment of the present invention will be described in greater detail. FIG. 2 is an illustrative diagram showing an example of a communication process in the communication system 1000 according to an embodiment of the present invention. Here, FIG. 2 shows an example of a communication process according to communication between the communication apparatus 100A and the communication apparatus 100B shown in FIG. 1. FIG. 2 also shows a case in which the communication apparatus 100A plays a role of a reception apparatus and the communication apparatus 100B plays a role of a transmission apparatus. Further, the communication apparatus 100 according to an embodiment of the present invention may play roles of both the transmission apparatus and the reception apparatus. Accordingly, the communication apparatus 100A may play a role of the transmission apparatus and the communication apparatus 100B may play a role of the reception apparatus. In FIG. 2, a case in which the first frequency is 5 GHz and the second frequency is 60 GHz is also shown.

The communication apparatus 100B synchronizes and transmits an RTS (Request to Send) packet at 5 GHz and an RTS packet at 60 GHz (period a in FIG. 2). Hereinafter, the RTS packet having the first frequency may be referred to as a "first transmission request" and the RTS packet having the second frequency may be referred to as a "second transmission request."

Figure 3:
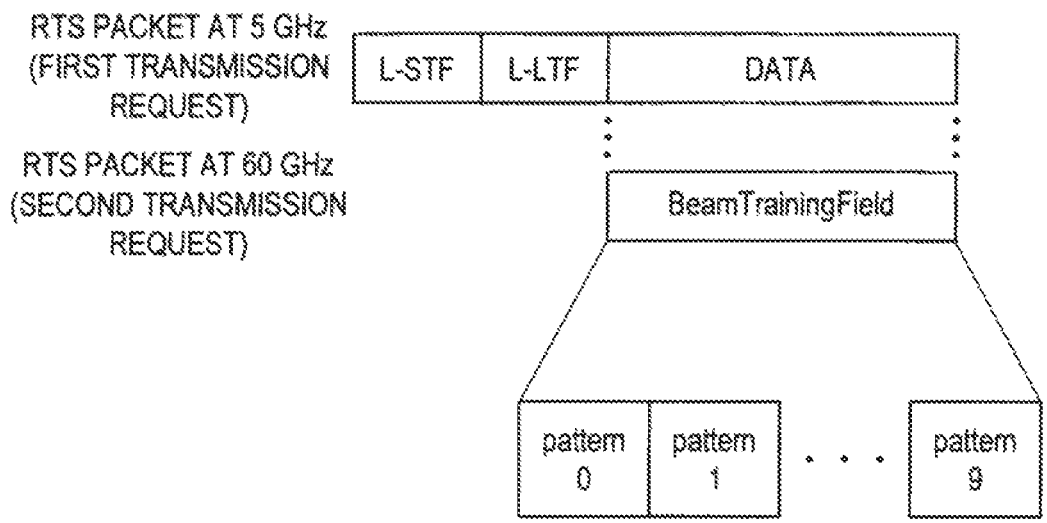
FIG. 3 is an illustrative diagram showing an example of a first transmission request and a second transmission request according to an embodiment of the present invention.

FIG. 3 is an illustrative diagram showing an example of the first transmission request and the second transmission request according to an embodiment of the present invention. Here, FIG. 3 shows a case in which the first frequency is 5 GHz and the second frequency is 60 GHz.

As shown in FIG. 3, the transmission apparatus makes the start position of the DATA portion of the RTS packet at 5 GHz coincident with a start position of BeamTrainingField of the RTS packet at 60 GHz and transmits each RTS packet. While the example in which an end position of the DATA portion of the RTS packet at 5 GHz is coincident with the start position of BeamTrainingField of the RTS packet at 60 GHz is shown in FIG. 3, a relationship between the end position of the DATA portion of the RTS packet at 5 GHz and the start position of BeamTrainingField of the RTS packet at 60 GHz is not limited to the example shown in FIG. 3.

Further, the transmission apparatus sets a plurality of transmission beam patterns in BeamTrainingField of the RTS packet at 60 GHz and transmits the RTS packet at 60 GHz. Here, the example in which the transmission apparatus sets 10 types of transmission beam patterns in BeamTrainingField of the RTS packet at 60 GHz is shown in FIG. 3, but an example in which the transmission apparatus sets the transmission beam patterns is not limited to the example shown in FIG. 3.

When a plurality of beam patterns are set in the RTS packet at 60 GHz as shown in FIG. 3 (the second transmission request), the RTS packet at 60 GHz may be a packet having a wide dynamic range.

The transmission of the RTS packet as shown in FIG. 3 from the transmission apparatus allows the reception apparatus to specify the start position of the RTS packet at 80 GHz (the second transmission request) based on the result of receiving the RTS packet at 5 GHz (the first transmission request). Further, a process related to specifying of the second transmission request in the reception apparatus may be recognized as a synchronization process in the communication apparatus 100.

<Synchronization Process According to Embodiment of the Present Invention>

Figure 4:
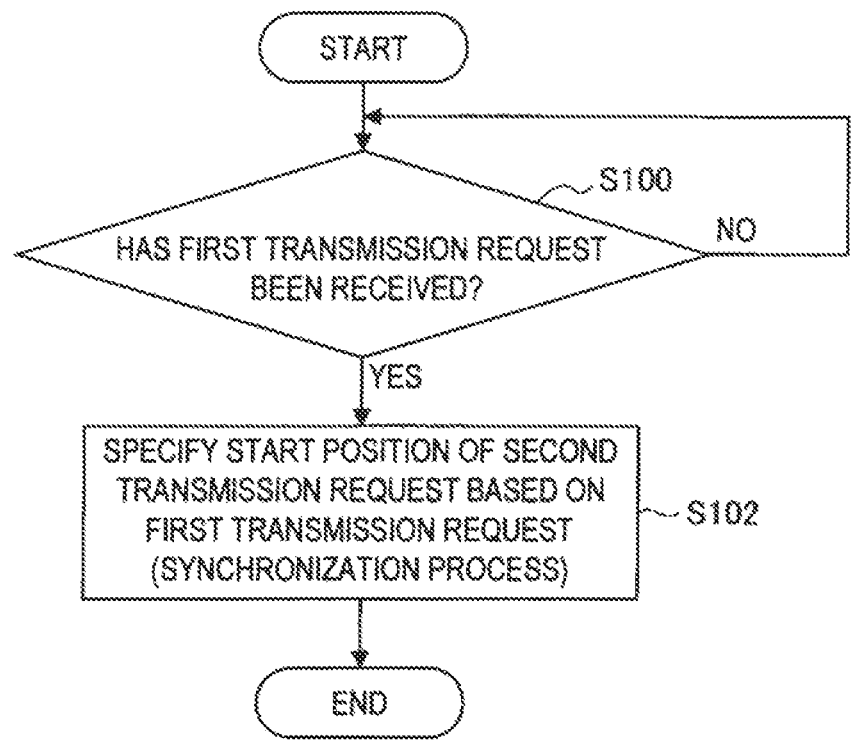
FIG. 4 is a flow diagram showing an example of a synchronization process in the communication apparatus according to an embodiment of the present invention.

FIG. 4 is a flow diagram showing an example of the synchronization process in the communication apparatus 100 according to an embodiment of the present invention. Hereinafter, the communication apparatus 100A playing a role of a reception apparatus will be described as performing the synchronization process shown in FIG. 4. However, the other communication apparatus 100 may similarly perform the process.

The communication apparatus 100A judges whether the first transmission request has been received (S100). Here, the communication apparatus 100A performs the judgment of step S100, for example, based on whether an L-STF or L-LTF portion of the RTS packet at 5 GHz shown in FIG. 3 has been detected.

When it is judged in step S100 that the first transmission request has not been received, the communication apparatus 100A does not perform the process until it is judged that the first transmission request has been received.

Further, when it is judged in step S100 that the first transmission request has been received, the communication apparatus 100A specifies the start position of the second transmission request based on the first transmission request (S102; synchronization process). Here, the communication apparatus 100A specifies the start position of the second transmission request (the start position of BeamTrainingField), for example, based on the start position of the DATA portion of the RTS packet at 5 GHz shown in FIG. 3.

The communication apparatus 100A may specify the start position of the second transmission request, for example, through the process shown in FIG. 4.

Further, a method of specifying the start position of the second transmission request in the communication apparatus 100A (or the other communication apparatus 100) according to an embodiment of the present invention is not limited to the method based on the start position of the DATA portion of the RTS packet at 5 GHz shown in FIG. 3. For example, a time interval from a predetermined position of the first transmission request to the start position of the second transmission request is determined in advance between the transmission apparatus and the reception apparatus constituting the information process system 1000, such that the communication apparatus 100A (reception apparatus) can specify the start position of the second transmission request. That is, the determination of the time interval allows the communication apparatus 100A (reception apparatus) to specify the start position of the second transmission request based on the predetermined position of the first received transmission request. Here, the predetermined position of the first transmission request may include, for example, a head portion or an end portion of L-STF and a head portion or an end portion of L-LTF of the RTS packet at 5 GHz shown in FIG. 3, but the present invention is not limited thereto. Further, in the above case, the transmission apparatus transmitting the signal by the carrier f2 having the second frequency (the second transmission request) at a predefined time interval from the predetermined position of the signal by the carrier f1 having the first frequency (the first transmission request) corresponds to the synchronized transmission.

Further, in the information process system 1000, the transmission apparatus transmits a first transmission request including data indicating the time interval from the predetermined position of the first transmission request to the start position of the second transmission request, thereby specifying the start position of the second transmission request in the reception apparatus. That is, in the above case, the communication apparatus 100A (reception apparatus) may uniquely specify the start position of the second transmission request based on the data indicating the time interval included in the first received transmission request. Further, in the above case, the transmission apparatus transmitting the signal by the carrier f2 having the second frequency (the second transmission request) at a predefined time interval from the predetermined position of the signal by the carrier f1 having a first frequency (the first transmission request) corresponds to the above synchronized transmission.

Hereinafter, a case in which the communication apparatus 100A (or the other communication apparatus 100) constituting the communication system 1000 specifies the start position of the second transmission request, for example, based on the start position of the DATA portion of the RTS packet at 5 GHz as shown in FIG. 3 will be described by way of example.

Referring back to FIG. 2, an example of a communication process in the communication system 1000 according to aft embodiment of the present invention will be described. The communication apparatus 100A determines the requested beam pattern, for example, based on the RTS packet at 60 GHz specified by the process shown in FIG. 4.

<Requested Beam Pattern Determination Process according to Embodiment of the Present Invention>

Figure 5:
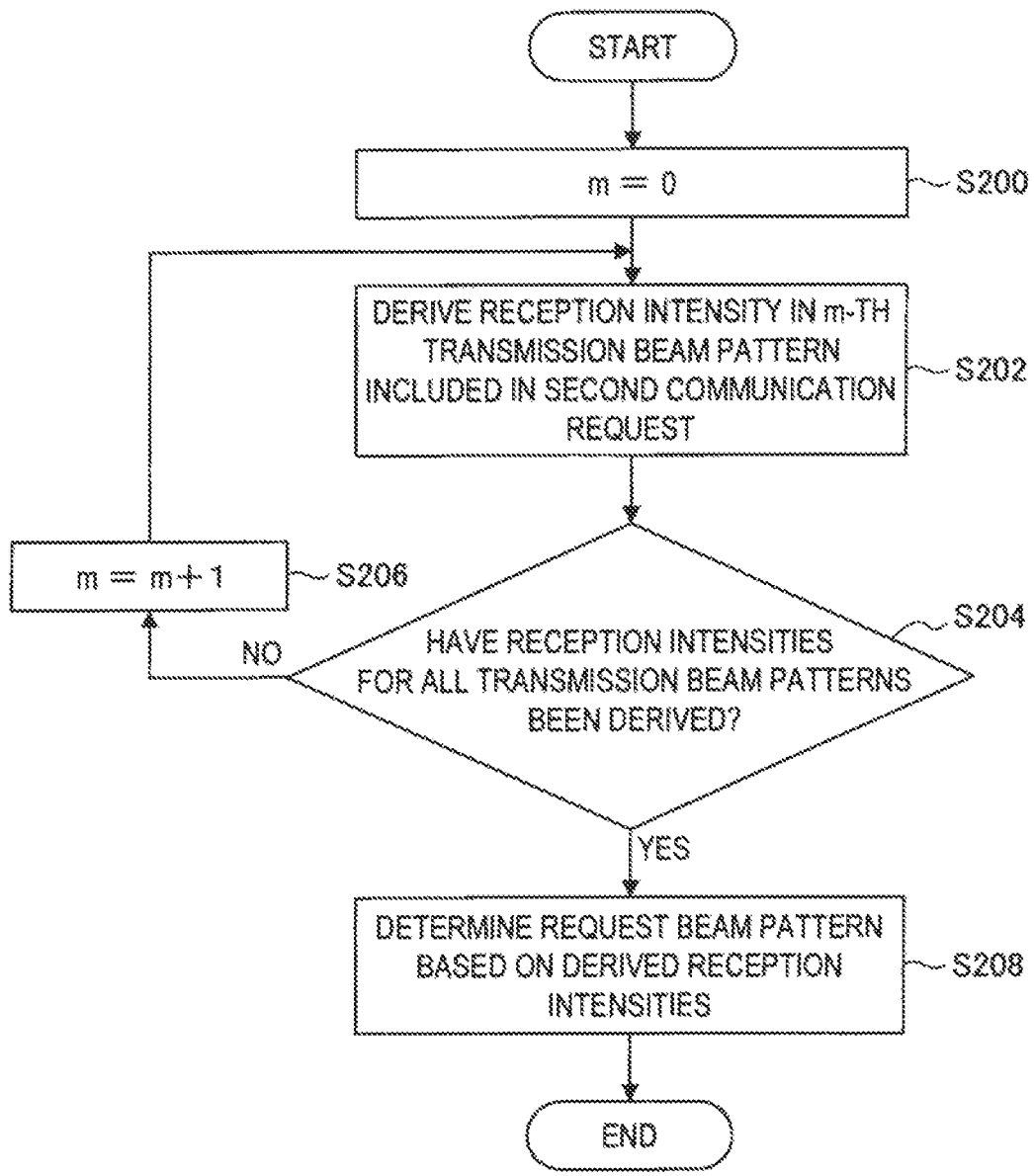
FIG. 5 is a flow diagram showing an example of a requested beam pattern determination process in the communication apparatus according to an embodiment of the present invention.

FIG. 5 is a flow diagram showing an example of a requested beam pattern determination process hi the communication apparatus 100 according to an embodiment of the present invention. Hereinafter, the communication apparatus 100A playing a role of a reception apparatus will be described as performing the requested beam pattern determination process shown in FIG. 5. However, the other communication apparatus 100 may similarly perform the process.

The communication apparatus 100A sets m to be m=0 (S200). Here, the process of step S200 corresponds to initialization of a processing number of the transmission beam pattern set in the second transmission request. Accordingly, the m value set in step S200 is not limited to 0.

The communication apparatus 100A derives reception intensity in an m-th transmission beam pattern included in the second communication request (S202). The communication apparatus 100A records the derived reception intensity for each transmission beam pattern. Here, the communication apparatus 100A derives reception power for each transmission beam pattern as reception intensity based on the received signal, but the present invention is not limited thereto. For example, the communication apparatus 100A may use an absolute value of the reception power for each transmission beam pattern as the reception intensity based on the received signal.

When the reception intensity is derived in step S202, the communication apparatus 100A judges whether reception intensities for all the transmission beam patterns included in the second communication request have been derived (S204).

When it is not judged in step S204 that the reception intensities for all the transmission beam patterns included in the second communication request have been derived, the communication apparatus 100A updates the m value to be "m=m+1" (S206). The communication apparatus 100A iteratively performs the process from step S202.

Further, when it is judged in step S204 that the reception intensities for all the transmission beam patterns included in the second communication request have been derived, the communication apparatus 100A determines the requested beam pattern based on the derived reception intensities (S208). Here, the communication apparatus 100A determines, for example, as the requested beam pattern, the transmission beam pattern having maximum reception intensity among the transmission beam patterns included in the second communication request, but a method of determining the requested beam pattern in the communication apparatus 100A is not limited thereto.

The communication apparatus 100A may determine the requested beam pattern based on the plurality of transmission beam patterns included in the second communication request, for example, through the process shown in FIG. 5. Further, it is understood that the process according to the determination of the requested beam pattern in the communication apparatus 100 according to an embodiment of the present invention is not limited thereto.

Referring back to FIG. 2, an example of the communication process in the communication system 1000 according to an embodiment of the present invention will be described. For example, when the requested beam pattern is determined through the process shown in FIG. 5, the communication apparatus 100A transmits requested team pattern identification information indicating the requested beam pattern with a CTS (Clear to Send) packet at 5 GHz (notification of completion of reception preparation) (period b in FIG. 2).

Here, the communication apparatus 100A (or the other communication apparatus 100) transmits, for example, the requested beam pattern as the requested beam pattern identification information, but the requested beam pattern identification information according to an embodiment of the present invention is not limited thereto. For example, the communication apparatus 100 according to an embodiment of the present invention may transmit, for example, an identification number indicating the requested beam pattern as the requested beam pattern identification information. Here, the identification number may include, for example, a number set in the transmission beam pattern corresponding to the requested beam pattern in advance, or a number indicating order of processing the transmission beam pattern corresponding to the requested beam pattern, but the present invention is not limited thereto. The communication apparatus 100A (reception apparatus) can reduce a data amount due to the transmission of the requested beam pattern, for example, by transmitting the identification number as the requested beam pattern identification information. Accordingly, the communication system 1000 can prevent throughput from being degraded due to the transmission of the requested beam pattern.

The communication apparatus 100B determines the transmission beam pattern based on the requested beam pattern identification information included in the received CTS packet at 5 GHz. The communication apparatus 100B transmits DATA (DATA packet) with the 60 GHz carrier by applying the determined transmission beam pattern (a period c in FIG. 2). Here, the communication apparatus 100B may perform DATA transmission by the 5 GHz carrier f1 together with DATA transmission by the 60 GHz carrier f2, as shown in the period c of FIG. 2.

Further, the example in which the communication apparatus 100A (reception apparatus) determines the requested beam pattern based on the reception intensities derived for all the transmission beam patterns included in the second communication request and transmits the requested beam pattern identification information has been shown, but an apparatus for determining the requested beam pattern in an embodiment of the present invention is not limited to the communication apparatus 100A (reception apparatus). For example, in the information process system 1000, the communication apparatus 100B (or the other communication apparatus 100) playing a role of a transmission apparatus may determine the requested beam pattern instead of the communication apparatus 100A playing a role of a reception apparatus (or the other communication apparatus 100). The above example will be described in greater detail. The communication apparatus 100A (reception apparatus) transmits, for example, the respective reception intensities derived for all the transmission beam patterns included in the second communication request, as the requested beam pattern identification information. The communication apparatus 100B (transmission apparatus) determines the requested beam pattern based on each reception intensity included in the received requested beam pattern identification information, and determines the transmission beam pattern based on the determined requested beam pattern. Even in the above case, the communication apparatus 100B (transmission apparatus) may determine the transmission beam pattern based on the same requested beam pattern as the requested beam pattern determined by the communication apparatus 100A (reception apparatus) in step S208 in FIG. 5. Accordingly, the communication apparatus 100B (transmission apparatus) may transmit DATA with a 60 GHz carrier by applying the transmission beam, pattern based on the requested beam pattern, similar to the case in which the communication apparatus 100A (reception apparatus) determines the requested beam pattern.

When the DATA has been received normally, the communication apparatus 100A transmits an ACK (ACKnowledgement) packet at 5 GHz to notify the communication apparatus 100B that the DATA has been received normally (period d in FIG. 2).

For example, the communication shown in FIG. 2 is performed between the communication apparatus 100A and the communication apparatus 100B, such that communication by the 60 GHz carrier f2 (faster than communication by the 5 GHz carrier f1) is stably performed in the communication system 1000. Further, it is understood that the communication between the communication apparatus 100A and the communication apparatus 100B in the communication system 1000 according to an embodiment of the present invention is not limited to the example shown in FIG. 2.

[Overview of Automatic Gain Control Approach according to Embodiment of the Present Invention]

In the communication system 1000 according to an embodiment of the present invention, for example, the communication shown in FIG. 2 (communication by the communication process according to an embodiment of the present invention) is performed, such that more reliable data transmission and reception can be realized by the carrier f2 having the second frequency. Here, in communication in the communication system 1000 according to an embodiment of the present invention, for example, a plurality of transmission beam patterns are set in the second transmission request transmitted from the communication apparatus 100 playing a role of a transmission apparatus, as shown in FIG. 3. Accordingly, the second transmission request may be a packet having a wide dynamic range.

Here, when the communication apparatus 100 performs automatic gain control at the head of the RTS packet at 60 GHz shown in FIG. 3 (the second transmission request) like a conventional communication apparatus, a very wide dynamic range of the RTS packet causes data outside a measurement range to be likely to be generated. In the above case, since the communication apparatus 100 cannot derive the reception intensity normally for each transmission beam pattern Included in the second transmission request, the communication apparatus 100 cannot determine the requested beam pattern from among the plurality of transmission beam patterns included in the second transmission request.

Here, the communication apparatus 100 processes, for example, the second transmission request (an example of the packet) having a dynamic range that is wide (likely to be wide) as shown in FIG. 3, for example, using the following approaches (1) and (2).

(1) First Approach

When the reception apparatus processes the second received transmission request using the AGC setting value obtained through the automatic gain control at the head of the second transmission request like a conventional communication apparatus, data outside the measurement range is likely to be generated. Here, in the communication system 1000, the transmission apparatus (one communication apparatus 100 transmits the second transmission request including an AGC setting value for causing the reception apparatus (the other communication apparatus 100) to perform the automatic gain control. The reception apparatus performs the automatic gain control using the AGC setting value Included in the second transmission request.

Here, the communication apparatus 100 playing a role of the transmission apparatus transmits the second transmission request in which a plurality of transmission beam patterns are set. Accordingly, the communication apparatus 100 playing a role of the transmission apparatus may transmit the second transmission request in which an AGC setting value corresponding to the second transmission request to be transmitted is set based on the plurality of transmission beam patterns included in the second transmission request to be transmitted. That is, the communication apparatus 100 playing a role of a reception apparatus may derive reception intensity normally for each transmission beam pattern irrespective of the dynamic range of the second transmission request by performing the automatic gain control using the AGC setting value included in the second transmission request. Accordingly, the communication apparatus 100 playing a role of a reception apparatus can determine the requested beam pattern from among the plurality of transmission beam patterns included in the second transmission request.

[Example of Second Transmission Request according to First Approach]

Figure 6:
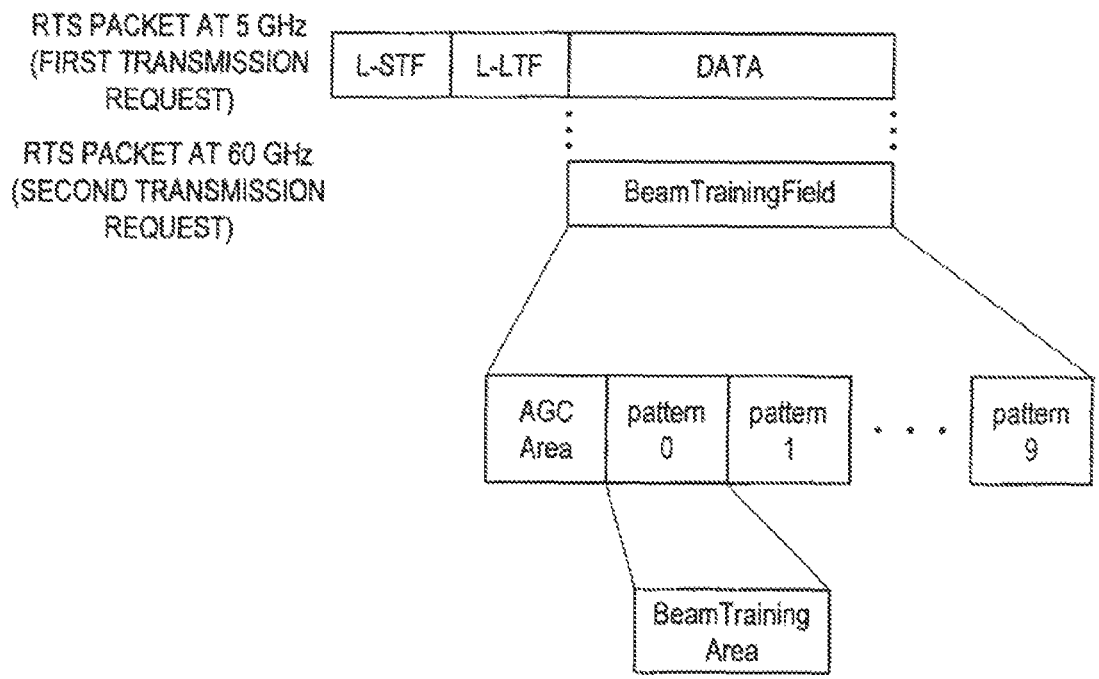
FIG. 6 is an illustrative diagram showing an example of a second transmission request in which an AGC setting value is set.

FIG. 6 is an illustrative diagram showing an example of the second transmission request. In which the AGC setting value is set. Here, FIG. 6 shows a case in which the first frequency is 5 GHz and the second frequency is 60 GHz, as in FIG. 3.

A plurality of transmission beam patterns are set in BeamTrainingField of an RTS packet at 60 GHz (the second transmission request) shown in FIG. 6, similar to the RTS packet at 60 GHz shown in FIG. 3. Further, an AGC area in which the AGC setting value is set is also provided in BeamTrainingField of the RTS packet at 60 GHz shown in FIG. 6.

Here, when the AGC setting value is set in a head of BeamTrainingField as shown in FIG. 6, the communication apparatus 100 playing a role of a reception apparatus performs automatic gain control based on the AGC setting value. As described above, when the reception apparatus performs the process based on one AGC setting value set for the plurality of transmission beam patterns included in the second transmission request, data outside a measurement range is likely to be generated although the AGC setting value is set by the transmission apparatus.

Thus, the communication apparatus 100 playing a role of a transmission apparatus according to an embodiment of the present invention transmits the second transmission request in which a corresponding AGC setting value is set for each transmission beam pattern set in the second transmission request.

Figure 7:
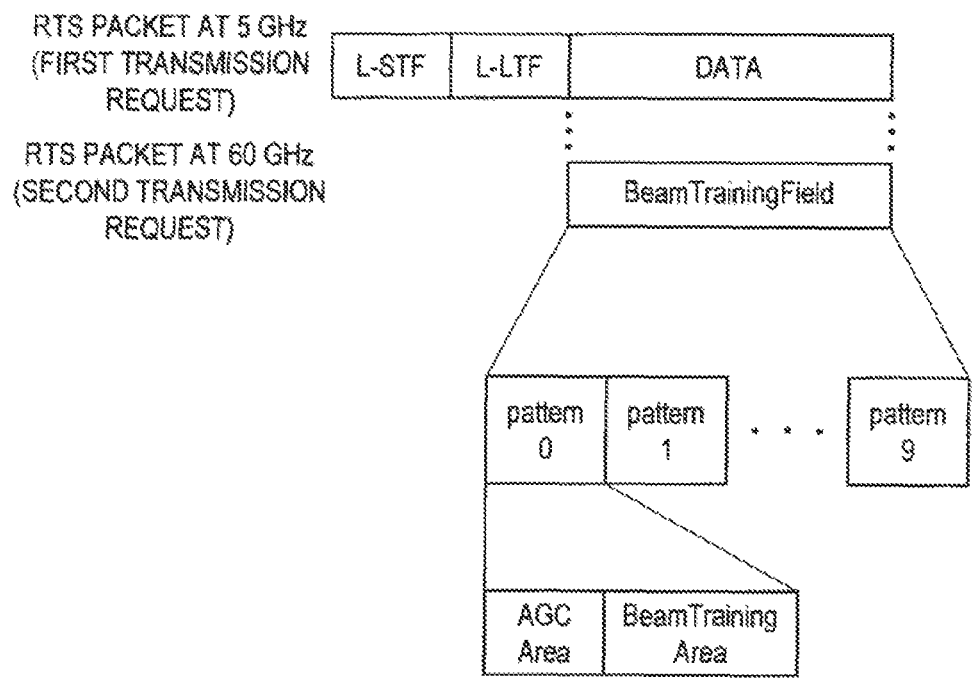
FIG. 7 is an illustrative diagram showing an example of a second transmission request in which an AGC setting value is set according to an embodiment of the present invention.

FIG. 7 is an illustrative diagram showing an example of the second transmission request in which the AGC setting value is set according to an embodiment of the present invention. Here, FIG. 7 shows a case in which the first frequency is 5 GHz and the second frequency is 60 GHz, as in FIG. 3.

A plurality of transmission beam patterns are set in BeamTrainingField of an RTS packet at 60 GHz (a second transmission request) shown in FIG. 7, similar to the RTS packet at 60 GHz shown in FIG. 3. Further, an AGC area in which the AGC setting value is set and a BeamTrainingField in which a transmission beam pattern is set are provided in each transmission beam pattern set in the RTS packet at 60 GHz.

Here, when the AGC setting value is set for each transmission beam pattern included in the second transmission request as shown in FIG. 7, the communication apparatus 100 playing a role of a reception apparatus performs automatic gain control based on the AGC setting value for each transmission beam pattern. In the above case, the communication apparatus 100 playing a role of a reception apparatus corresponds to processing of a packet having substantially single directivity.

Accordingly, the communication apparatus 100 playing a role of a reception apparatus may derive reception intensity normally for each transmission beam pattern irrespective of the dynamic range of the second transmission request. Accordingly, the communication apparatus 100 playing a role of a reception apparatus can determine a requested beam pattern from among the plurality of transmission beam patterns included in the second transmission request.

Further, the second transmission request in which the AGC setting value is set according to an embodiment of the present invention is not limited to the configuration shown in FIG. 7. For example, the communication apparatus 100 playing a role of a transmission apparatus according to an embodiment of the present invention may transmit a second transmission request with a predetermined no signal period (gap) between the transmission beam patterns shown in FIG. 7. In the above case, the communication apparatus 100 playing a role of a reception apparatus can secure more time for deriving the reception intensity for each transmission beam pattern.

As described above, in the first approach, the communication apparatus 100 playing a role of a transmission apparatus transmits, for example, the second transmission request in which the AGC setting value (a first automatic gain control setting value) corresponding to each set transmission beam pattern is set, as shown in FIG. 7. The communication apparatus 100 playing a role of a reception apparatus performs the automatic gain control for each transmission beam pattern based on the AGC setting value corresponding to each transmission beam pattern included in the second transmission request. Thus, since the communication apparatus 100 playing a role of a reception apparatus can prevent data outside the measurement range from being generated despite the width of the dynamic range of the second transmission request, the communication apparatus 100 can process the packet having a wide dynamic range.

Thus, the use of the first approach allows the communication apparatus 100 to process a packet having a wide dynamic range in communication using the directivity of the antenna.

(Second Approach)

The method by which the communication apparatus 100 performs the automatic gain control for each transmission beam pattern based on the second transmission request in which the AGC setting value is set for each transmission beam pattern has been shown as the first approach for automatic gain control in the communication apparatus 100 according to an embodiment of the present invention. However, the method of automatic gain control for the second transmission request (an example of the packet) having a dynamic range that is wide (likely to be wide) according to an embodiment of the present invention is not limited thereto. Here, a method of automatic gain control for a second transmission request when the AGC setting value is not set in the second transmission request will now be described as a second approach for automatic gain control in the communication apparatus 100 according to an embodiment of the present invention.

Figure 8:
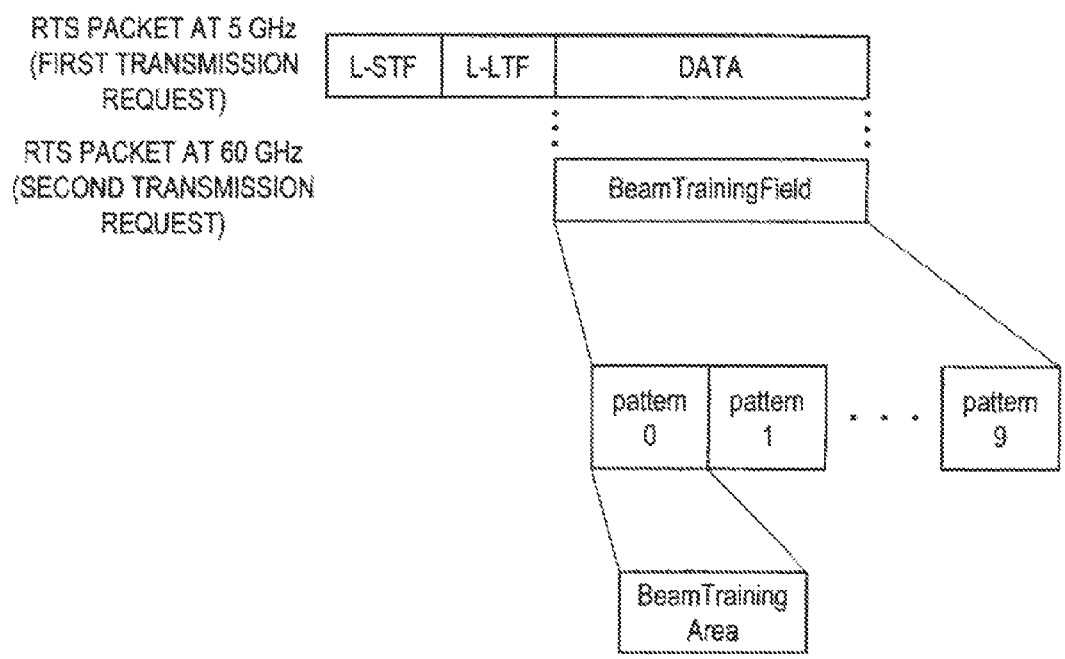
FIG. 8 is an illustrative diagram showing an example of a second transmission request according to an embodiment of the present invention.

FIG. 8 is an illustrative diagram showing an example of a second transmission request according to an embodiment of the present invention. Here, FIG. 8 shows a case in which the first frequency is 5 GHz and the second frequency is 60 GHz, as in FIG. 3.

In an RTS packet at 60 GHz (the second transmission request) shown in FIG. 8, a plurality of transmission beam patterns are set in BeamTrainingField similar to the RTS packet at 60 GHz shown in FIG. 3. Further, the AGC area according to the first approach as shown in FIG. 7 is not provided in the RTS packet at 60 GHz.

In order to process the second transmission request in which the AGC setting value is not set as shown in FIG. 8, the communication apparatus 100 divides a plurality of antennas into a plurality of groups and includes a plurality of AGC circuits corresponding to the groups. Further, the communication apparatus 100 sets a different AGC setting value (a third automatic gain control setting value) for each AGC circuit corresponding to the group. Setting the different AGC setting value for the AGC circuit corresponding to each group in advance allows the communication apparatus 100 to make a determination of the requested beam pattern that selectively uses the second transmission request subjected to the automatic gain control in any AGC circuit. Hereinafter, one, two or more antennas, an analog circuit corresponding to the antenna, and an AGC circuit for processing a signal received by the antenna will foe described as constituting one group. Further, it is understood that a configuration of the group in the present invention is not limited thereto.

When the reception intensity of the signal processed by the communication apparatus 100 is in a range of 0 [dBm] to −90 [dBm], the communication apparatus 100 includes, for example, a plurality of antennas divided into three groups for receiving a carrier f2 having a second frequency, and an AGC circuit tor each group. The three groups include, for example, a first group capable of receiving a range of 0 [dBm] to −30 [dBm], a second group capable of receiving a range of −30 [dBm] to −60 [dBm], and a third group capable of receiving a range of −60 [dBm] to −90 [dBm]. Further, it is understood that the number of groups according to an embodiment of the present Invention is not limited to 3 and the range that can be received is not limited thereto.

The communication apparatus 100 covers an entire range (or a wide range) of reception intensity to be processed, through the plurality of groups, such that the communication apparatus 100 can derive reception intensity normally for each transmission beam pattern based on the second transmission request output from the AGC circuit corresponding to any group. Accordingly, the communication apparatus 100 can determine the requested beam pattern from among the plurality of transmission beam patterns included in the second transmission request.

Figure 9:
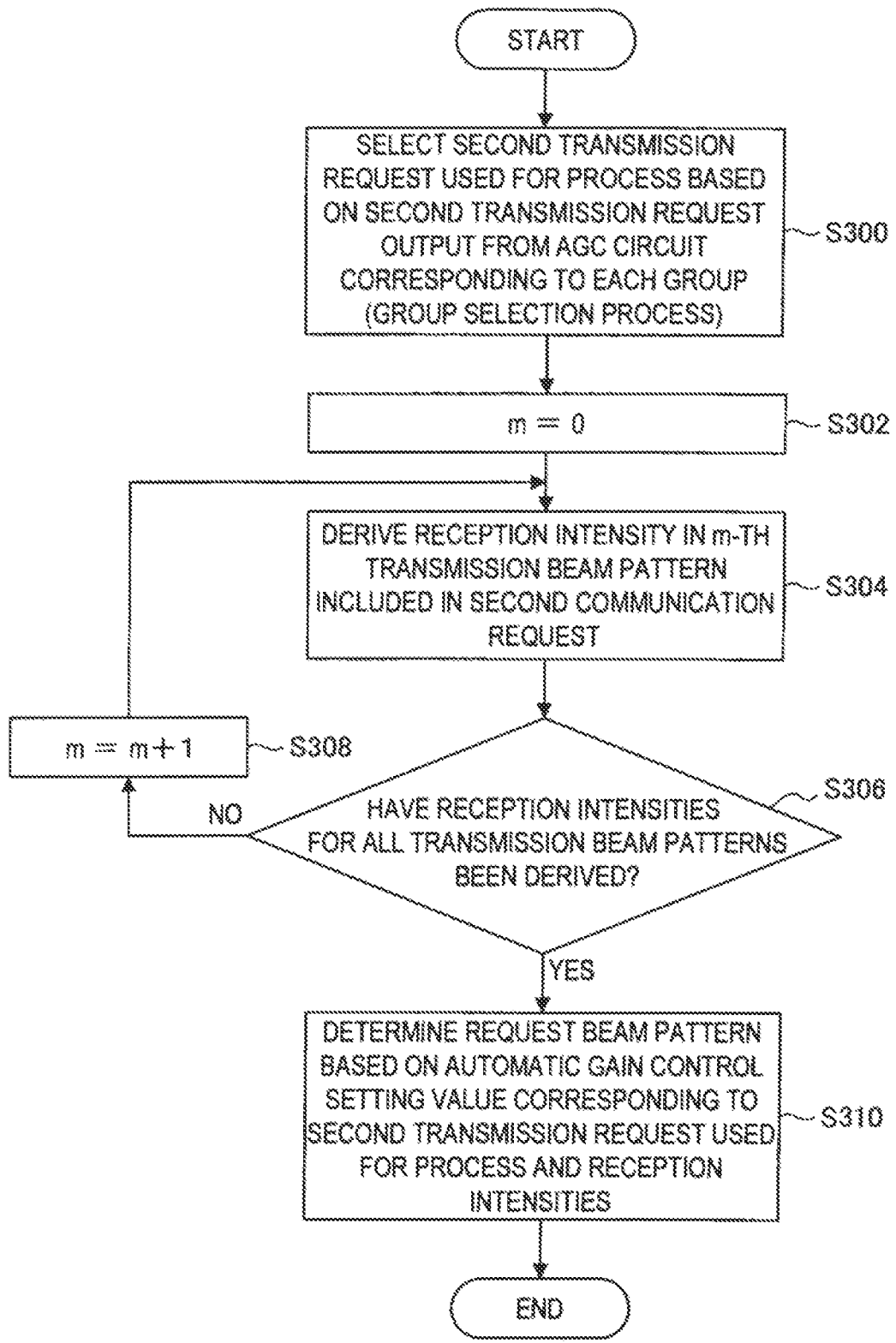
FIG. 9 is a flow diagram showing an example of a requested beam pattern determination process in the communication apparatus according to an embodiment of the present invention.

Here, an example of the requested beam pattern determination process in the communication apparatus 100 using the second approach will be described. FIG. 9 is a flow diagram showing an example of the requested beam pattern determination process in the communication apparatus 100 according to an embodiment of the present invention.

The communication apparatus 100 selects the second transmission request used for a process based on the second transmission request output from the AGC Circuit corresponding to each group (S300). Here, the process in step S300 corresponds to a group selection process of selecting a group.

[Group Selection Process according to Embodiment of the Present Invention]

Here, the group selection process according to an embodiment of the present invention will be described. FIG. 10 is an illustrative diagram illustrating an example of the group selection process according to an embodiment of the present invention. Here, FIG. 10 shows a case in which the communication apparatus 100 receives the carrier f2 having the second frequency with 3 receiving systems (hereinafter, also referred to as "branches"), i.e., in which the communication apparatus 100 has three groups, each receiving a signal. Further, FIG. 10 shows an example in which branch 0 (group 0) serves a range of 0 [dBm] to −30 [dBm], branch 1 (group 1) serves a range of −30 [dBm] to −60 [dBm], and branch 2 (group 2) serves a range of −60 [dBm] to −90 [dBm].

For example, when the resolution of an AD converter (Analog to Digital Converter) constituting each group is 10 bits, the communication apparatus 100 selects one group based on a value p of a signal (p is an integer; −511≤p≤511) output from the AGC circuit of each group.

More specifically, the communication apparatus 100 derives, for example, an average value p' of absolute values of values p for each group in a predetermined period and selects a group whose average value p' is closer to 256 (a middle point between 0 and 511). This is because when the average value p' is 511, the signal output from the AGC circuit is too great to be out of range and when the average value p' is 0, the received signal is small. Accordingly, the communication apparatus 100 selects group 0 (branch 0) in case 1 of FIG. 10 and selects group 1 (branch 1) in case 2. The communication apparatus 100 selects group 2 (branch 2) in case 3.

The communication apparatus 100 performs, for example, the above process and selects the group, such that the communication apparatus 100 can select the second transmission request used for the process based on the second transmission request output from the AGC circuit corresponding to each group. Further, the group selection method according to an embodiment of the present Invention is not limited to the above method.

Referring back to FIG. 9, an example of the requested beam pattern determination process in the communication apparatus 100 using the second approach will be described. The communication apparatus 100 sets m to be m=0 (S302), similar to step S200 in FIG. 5. Further, the m value set in step S302 is not limited to 0.

The communication apparatus 100 derives reception intensity in the m-th transmission beam pattern included in the second communication request, as in step S202 in FIG. 5 (S304). The communication apparatus 100 records the derived reception intensity for each transmission beam pattern. Here, the communication apparatus 100 derives reception power for each transmission beam pattern based on the received signal, as reception intensity, but the present invention is not limited thereto. For example, the communication apparatus 100 may use am absolute value of the reception power for each transmission beam pattern based on the received signal, as the reception intensity.

When the reception intensity is derived in step S304, the communication apparatus 100 judges whether reception intensities for all the transmission beam patterns included in the second communication request have been derived, as in step S204 in FIG. 5 (S306).

When it is not judged in step S306 that the reception intensities for all the transmission beam patterns included in the second communication request have been derived, the communication apparatus 100 updates the m value to be "m=m+1," similar to step S206 in FIG. 5 (S308). The communication apparatus 100A iteratively performs the process from step S304.

Further, when it is judged in step S306 that the reception intensities for all the transmission beam patterns included in the second communication request have been derived, the communication apparatus 100 determines the requested beam pattern based on the derived reception intensities, as in step S208 in FIG. 3 (S310). Here, the communication apparatus 100 determines, for example, the transmission beam pattern having maximum reception intensity among the transmission beam patterns included in the second communication request, as the requested beam pattern. However, the method of determining the requested beam, pattern in the communication apparatus 100 is not limited thereto.

For example, as shown in FIG. 9, the communication apparatus 100 using the second approach selects one second communication request from among the second communication requests output from the AGC circuits corresponding to the respective groups. The communication apparatus 100 performs the same process as the requested beam pattern determination process shown in FIG. 5 based on the plurality of transmission beam patterns included in the selected second communication request. Accordingly, the communication apparatus 100 using the second approach can determine the requested beam pattern based on the second received transmission request. Further, it is understood that the process according to the determination of the requested beam pattern in the communication apparatus 100 using the second approach is not limited to the above process.

As described above, in the second approach, the communication apparatus 100 divides the plurality of antennas into a plurality of groups and includes a plurality of AGC circuits corresponding to the groups. Further, the communication apparatus 100 sets a different AGC setting value (the third automatic gain control setting value) for each AGC circuit corresponding to the group. Setting the different AGC setting value for the AGC circuit corresponding to each group allows the communication apparatus 100 to derive the reception intensity normally for each transmission beam pattern using any second transmission request output from the AGC circuit corresponding to each group. Thus, the communication apparatus 100 can determine the requested beam pattern from among the plurality of transmission beam patterns included in the second transmission request irrespective of the dynamic range of the second transmission request.

Thus, the use of the second approach allows the communication apparatus 100 to process a packet having a wide dynamic range in communication using the directivities of the antennas.

Further, when the communication apparatus 100 constituting the communication system 1000 uses the second approach, the AGC area is not provided in the second transmission request transmitted from the communication apparatus 100 playing a role of a transmission apparatus, as shown in FIG. 8. Accordingly, the communication system 1000 having the communication apparatus 100 using the second approach can improve throughput compared to the communication system 1000 having the communication apparatus 100 using the first approach.

In the communication system 1000 according to an embodiment of the present invention, each communication apparatus 100 uses, for example, the approaches indicated in (1) and (2) in communication using the carrier f2 having the second frequency. Accordingly, the communication apparatus 100 may process a packet having a dynamic range that is wide (likely to be wide), such as the second transmission request as shown in FIG. 3, in communication using the directivities of the antennas.

Next, a configuration of the communication apparatus 100 capable of realizing the automatic gain control approach according to an embodiment of the present invention according to an embodiment of the present invention, will be described. Hereinafter, a communication apparatus that realizes approach (1) (the first approach) will be described as a "communication apparatus 100" and a communication apparatus that realizes approach (2) (the second approach) will be described as a "communication apparatus 200".

(Communication Apparatus According to First Embodiment)

Figure 11:
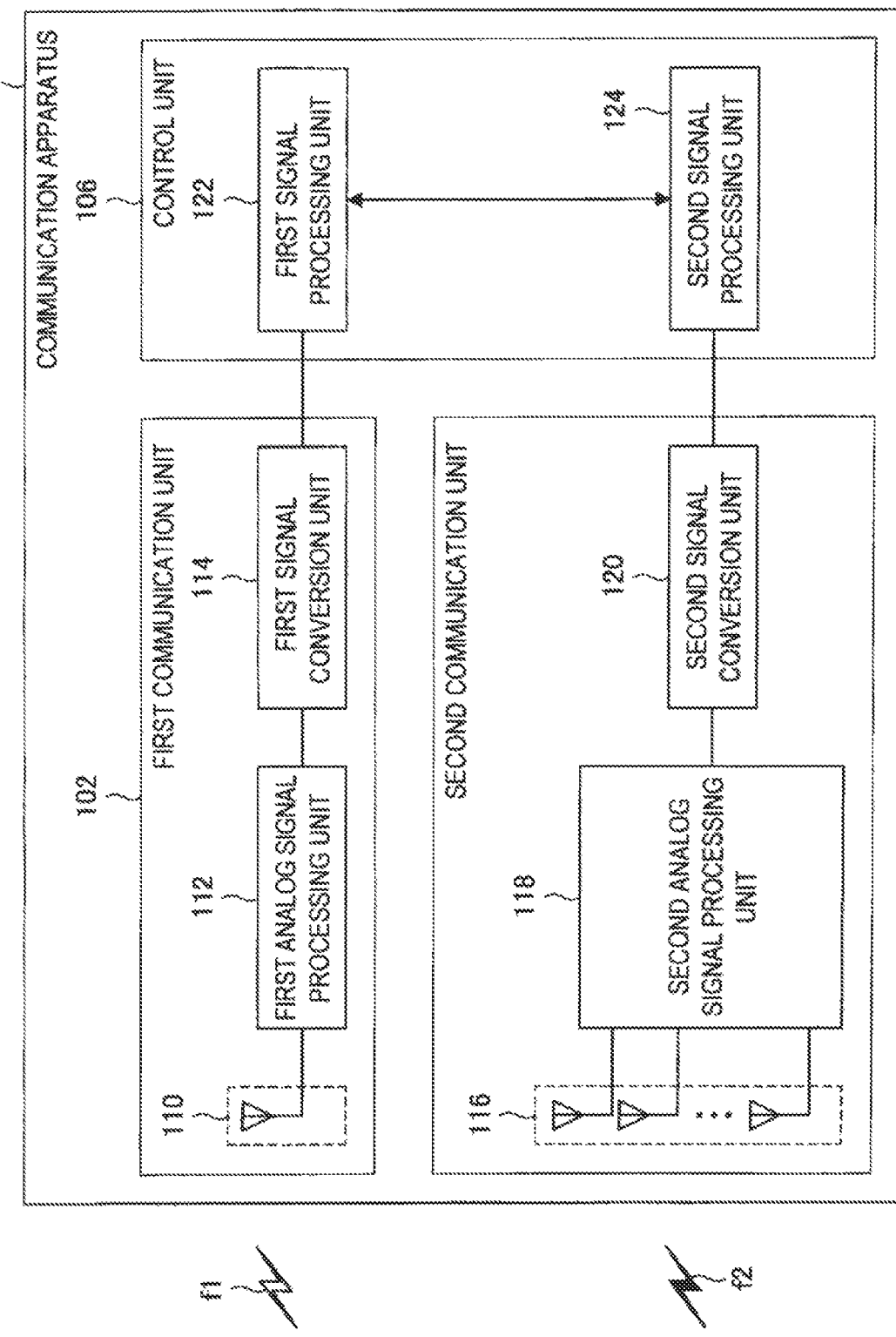
FIG. 11 is an illustrative diagram showing an example of a configuration of a communication apparatus according to a first embodiment of the present invention.

FIG. 11 is an illustrative diagram showing an example of a configuration of the communication apparatus 100 according to a first embodiment of the present invention.

The communication apparatus 100 includes a first communication unit 102, a second communication unit 104, and a control unit 106. Further, the communication apparatus 100 may include, for example, a ROM (Read Only Memory; not shown), a RAM (Random Access Memory; not shown), a storage unit (not shown), a manipulation unit (not shown), a display unit (not shown) and the like. In the communication apparatus 100, for example, the respective components may be connected by a bus as a data transmission line. Here, the ROM stores control data such as a program or an operation parameter used by the control unit 106. The RAM first stores, for example, a program executed by the control unit 106.

The storage unit (not shown) is a storage means included in the communication apparatus 100, and stores a variety of data such as various data or applications. Here, the storage unit (not shown) may include, for example, a magnetic recording medium such as a hard disk or a nonvolatile memory such as a flash memory, but the present invention is not limited thereto.

The manipulation unit (not shown) is a manipulation means included in the communication apparatus 100 for enabling a manipulation by a user. The communication apparatus 100 may perform a process desired by a user by Including the manipulation unit (not shown). Here, the manipulation unit (not shown) may include, for example, a manipulation input apparatus such as a keyboard or a mouse, or buttons, direction keys, a rotatable selector such as a jog dial, or a combination thereof, but the present invention is not limited thereto.

The display unit (not shown) is a display means included in the communication apparatus 100 and displays various information on a display screen. The screen displayed on the display screen of the display unit (not shown) may include, for example, a manipulation screen for causing a desired operation to be performed on the communication apparatus 100, or a screen indicating a communication state. Here, the display unit (not shown) may include, for example, an LCD (liquid crystal display) or an organic EL display (organic electroluminescence display or an OLED display (organic light emitting diode display)), but the present invention is not limited thereto.

The first communication unit 102 is a first communication means included in the communication apparatus 100 and performs wireless communication with an external apparatus using a earner f1 having a first frequency. Further, the first communication unit 102 includes a first communication antenna 110, a first analog signal processing unit 112, and a first signal conversion unit 114.

The first communication antenna 110 transmits a signal by the carrier f1 having the first frequency to one, two or more external apparatuses, and receives the signal by the carrier f1 having the first frequency transmitted from the external apparatus. Hereinafter, the signal transmitted from the first communication antenna 110 may be referred to a "first transmission signal" and the signal received by the first communication antenna 110 may be referred to a "first reception signal."

The first analog signal processing unit 112 processes the first reception signal (analog signal) received by the first communication antenna 110 and delivers a resultant signal to the first signal conversion unit 114. Further, the first analog signal processing unit 112 processes a signal (analog signal) delivered from the first signal conversion unit 114 and causes the first transmission signal to be transmitted from the first communication antenna 110. Here, a process in the first analog signal processing unit 112 may include, for example, amplification of each signal or noise removal, but the process is not limited thereto. Further, the first analog signal processing unit 112 includes, for example, an integrated circuit having various circuits such as an amplifier or a low pass filter integrated therein.

The first signal conversion unit 114 converts a signal (analog signal) corresponding to the first reception signal delivered from the first analog signal processing unit 112 into a digital signal, and delivers the digital signal to the control unit 106 (more specifically, a first communication processing unit 122, which will be described below). Further, the first signal conversion unit 114 delivers a signal (digital signal) corresponding to the first transmission signal delivered from the control unit 106 (more specifically, the first communication processing unit 122, which will be described) to the first analog signal processing unit 112. Here, the first signal conversion unit 114 includes, for example, an AD converter and a DA converter (Digital to Analog Converter), but is not limited thereto.

The first communication unit 102 can perform wireless communication with an external apparatus using the carrier f1 having the first frequency by including the first communication antenna 110, the first analog signal processing unit 112, and the first signal conversion unit 114.

The second communication unit 104 is a second communication means included in the communication apparatus 100, and performs wireless communication with an external apparatus using a carrier f2 having a second frequency. Further, the second communication unit 104 includes a second communication antenna 116, a second analog signal processing unit 118, and a second signal conversion unit 120.

The second communication antenna 116 includes a plurality of communication antennas, and transmits a signal by the carrier f2 having the second frequency to one, two or more external apparatuses and receives the signal by the carrier f2 having the second frequency transmitted from the external apparatuses. Hereinafter, a signal transmitted from the second communication antenna 116 may be referred to as a "second transmission signal" and a signal received by the second communication antenna 116 may be referred to as a "second reception signal."

The second analog signal processing unit 118 processes the second reception signal (analog signal) received by each communication antenna constituting the second communication antenna 116 and delivers the second reception signal to the second signal conversion unit 120. Further, the second analog signal processing unit 118 processes a signal (analog signal) delivered from the second signal conversion unit 120 and causes the second transmission signal to be transmitted from each communication antenna constituting the second communication antenna 116. Here, a process in the second analog signal processing unit 118 may include, for example, amplification of each signal, or noise removal, but the process is not limited thereto. Further, the second analog signal processing unit 118 includes, for example, an integrated circuit having various circuits such as an amplifier or a low pass filter integrated therein, similar to the first analog signal processing unit 112.

The second signal conversion unit 120 converts a signal (analog signal) corresponding to the second reception signal delivered from the second analog signal processing unit 118 into a digital signal, and delivers the digital signal to the control unit 106 (more specifically, a second communication processing unit 124 which will be described below). Further, the second signal conversion unit 120 delivers a signal (digital signal) corresponding to the second transmission signal delivered from the control unit 106 (more specifically, the second communication processing unit 124 which will be described below) to the second analog signal processing unit 118. Here, the second signal conversion unit 120 includes, for example, an AD converter and a DA converter, similar to the first signal conversion unit 114, but the second signal conversion unit 120 is not limited thereto.

The second communication unit 104 can perform wireless communication with an external apparatus using the carrier f2 having the second frequency by including the second communication antenna 116, the second analog signal processing unit 118, and the second signal conversion unit 120.

The control unit 106 includes, for example, an MPU (Micro Processing Unit) or an integrated circuit having various processing circuits integrated therein, and controls the entire communication apparatus 100. Further, the control unit 106 includes the first communication processing unit 122 and the second communication processing unit 124 and plays a leading role of performing the above-described communication process according to an embodiment of the present invention.

The first communication processing unit 122 processes the first reception signal delivered from the first communication unit 102 and transmits the Fust transmission signal to the first communication unit 102. Here, the first communication processing unit 122 may perform the process in conjunction with the second communication processing unit 124. For example, the first communication processing unit 122 transmits the first transmission signal according to a transmission command from the second communication processing unit 124 to the first communication unit 102.

[Example of Processing First Reception Signal in First Communication Processing Unit 122]

Here, an example of processing the first reception signal in the first communication processing unit 122 will be described. The first communication processing unit 122 generates information indicating reception initiation of the second transmission request (an example of the second reception signal), for example, based on the first transmission request (an example of the first reception signal) delivered from the first communication unit 102, and delivers the generated information indicating the reception initiation to the second communication processing unit 124.

Here, the information indicating reception initiation is a trigger to initiate the synchronization process in the second communication processing unit 124. The information indicating reception initiation may include, for example, packet position information indicating a position of a predetermined packet included in the first transmission request or information indicating a position when a predetermined time interval has elapsed from a predetermined position of the first transmission request, but the present invention is not limited thereto. Hereinafter, the packet position information will be described as the information indicating reception initiation by way of example. Here, the packet position information may include, for example, a pulse signal indicating that the position of the predetermined packet of the first transmission request has been detected, but the present invention is not limited thereto. For example, the packet position information according to an embodiment of the present invention may be any signal or data capable of playing a role of a trigger for the synchronization process. Further, other information indicating reception initiation according to an embodiment of the present invention may be realized by the same signal or data as the packet position information.

Further, for example, when the requested beam pattern identification information is delivered from the first communication unit 102, the first communication processing unit 122 delivers the requested beam pattern identification information to the second communication processing unit 124.

The first communication processing unit 122, for example, performs the processing as described above, as processing of the first reception signal. Further, processing of the first reception signal in the first communication processing unit 122 is not limited thereto.

The second communication processing unit 124 processes the second reception signal delivered from the second communication unit 104, and transmits the second transmission signal to the second communication unit 104. Here, the second communication processing unit 124 may perform the processing in conjunction with the first communication processing unit 122. For example, the second communication processing unit 124 performs the processing, for example, based on the packet position information delivered from the first communication processing unit 122 or the requested beam pattern identification information.

[Example of Configuration of Second Communication Processing Unit 124]

Figure 12:
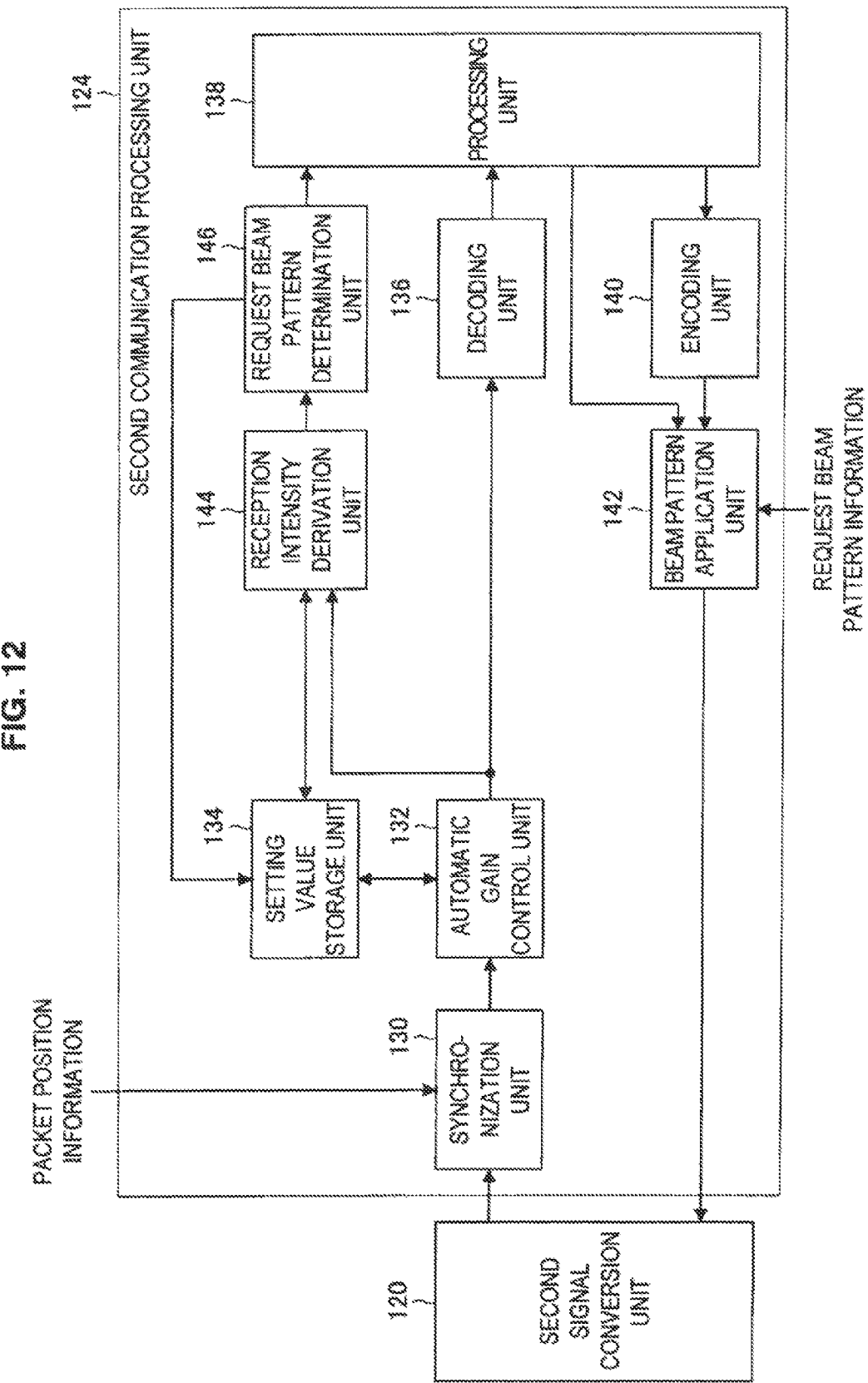
FIG. 12 is an illustrative diagram showing an example of a configuration of a second communication processing unit according to the first embodiment of the present invention.

Here, a configuration of the second communication processing unit 124 will be described in greater detail. FIG. 12 is an illustrative diagram showing an example of the configuration of the second communication processing unit 124 according to the first embodiment of the present invention. In FIG. 12, the second signal conversion unit 120 constituting the second communication unit 104 is also shown.

The second communication processing unit 124 includes a synchronization unit 130, an automatic gain control unit 132, a setting value storage unit 134, a decoding unit 136, a processing unit 138, an encoding unit 140, a beam pattern application unit 142, a reception intensity derivation unit 144, and a requested beam pattern determining unit 146. Here, the second communication processing unit 124 further includes a beam pattern storage unit (not shown) in which information (e.g., a weight coefficient) of a transmission beam pattern for being applied to a signal to be transmitted to an external apparatus is stored.

The synchronization unit 130 specifies a start position of the second transmission request based on the packet position information delivered from the first communication processing unit 122. Here, the specifying of the start position of the second transmission request in the synchronization unit 130 corresponds to a packet extraction process.

Further, the synchronization unit 130 may deliver a signal indicating that the second transmission request has been received to the reception intensity derivation unit 144. The delivery of the signal indicating that the second transmission request has been received enables the reception intensity derivation unit 144 to selectively perform a process when the second transmission request is received.

Further, when the second communication unit 104 receives the DATA shown in FIG. 2, the synchronization unit 130 achieves synchronization with the process of the first communication processing unit 122, for example, through bit synchronization or character synchronization, but the present invention is not limited thereto.

When the delivered signal is the second transmission request, the automatic gain control unit 132 adjusts a gain of the second transmission request for the AGC setting value (the first automatic gain control setting value) set for each transmission beam pattern included in the second transmission request. Further, the automatic gain control unit 132 holds each AGC setting value set in the second transmission request in the setting value storage unit 134.

Further, when the delivered signal is not the second transmission request, the automatic gain control unit 132 adjusts a gain of the delivered signal (a signal corresponding to the second reception signal) based on the AGC setting value (the second automatic gain control setting value) stored in the setting value storage unit 134. Here, the automatic gain control unit 132 performs the automatic gain control using the AGC setting value stored in the setting value storage unit 134 as a fixed value, but the present invention is not limited thereto. For example, the automatic gain control unit 132 may use the AGC setting value stored in the setting value storage unit 134 as an initial value of the automatic gain control.

Further, the automatic gain control unit 132 has, for example, an AGC circuit including an LNA (Low Noise Amplifier) for performing switching of a great gain or a VGA (Variable Gain Amplifier) for performing switching of a smaller gain, but the configuration of the automatic gain control unit 132 is not limited thereto.

The setting value storage unit 134 stores the AGC setting value (the second automatic gain control setting value). The AGC setting value stored in the setting storage unit 134 may include, for example, an AGC setting value (the first automatic gain control setting value) corresponding to the transmission beam patterns included in the second transmission request determined as the requested beam pattern by the requested beam pattern determining unit 146, but the present invention is not limited thereto.

For example, when the second transmission request is simultaneous transmission of the transmission beam patterns because series orthogonal or quasi-orthogonal is assigned to each transmission beam pattern, the setting value storage unit 134 may store an AGC setting value increasing the gain compared to the AGC setting value corresponding to the requested beam pattern. This is because, for example, when the AGC setting value acquired from the RTS packet at 60 GHz shown in FIG. 2 is used, reception intensity when the DATA is received is likely to be several times the reception intensity when the transmission beam pattern corresponding to the requested beam pattern is received.

Here, the setting value storage unit 134 switches the stored AGC setting value to the AGC setting value corresponding to the requested beam pattern or the AGC setting value increasing the gain, for example, by judging a type of the second transmission request, but a method of switching the stored AGC setting value in the setting value storage unit 134 is not limited thereto. For example, the setting value storage unit 134 may perform the switching based on a signal indicating the type of the second transmission request delivered from another component (e.g., the processing unit 138). Further, it is understood that it may be defined in advance whether the AGC setting value corresponding to the requested beam pattern or the AGC setting value increasing the gain is to be stored in the setting value storage unit 134 according to an embodiment of the present invention.

The setting value storage unit 134 also holds each AGC setting value (the first automatic gain control setting value) set in the second transmission request delivered from the automatic gain control unit 132.

Further, the setting value storage unit 134 is a recording medium tor storing and holding the AGC setting value and includes, for example, a volatile memory and a nonvolatile memory, but the present invention is not limited thereto. Here, each AGC setting value (the first automatic gain control setting value) set in the second transmission request delivered from the automatic gain control unit 132 is held, for example, in the volatile memory, such as an SRAM (Static Random Access Memory). Further, the AGC setting value (the second automatic gain control setting value) corresponding to the requested beam pattern is stored, for example, in the nonvolatile memory, such as a flash memory.

The decoding unit 136 performs, for example, demodulation or demapping based on the signal having the adjusted gain (digital signal) output from the automatic gain control unit 132. Here, a demodulation scheme in the decoding unit 136 may include, for example, an OFDM (Orthogonal Frequency Division Multiplexing) modulation scheme, but the present invention is not limited thereto.

The processing unit 138 plays a role of performing various signal processing in the second communication processing unit 124.

[Example of Signal Processing in Processing Unit 138]

Here, an example of signal processing in the processing unit 138 will be described. The processing unit 138 processes the signal delivered from the decoding unit 136, and delivers a signal resulting from the processing to the encoding unit 140.

Further, the processing unit 138 performs a process of transmitting a transmission request in which one or two or more transmission beam patterns are set in one packet and the AGC setting value is set for each transmission beam pattern, to the second communication unit 104. Here, the process in the processing unit 138 may include a process of controlling the beam pattern application unit 142, which is performed. In synchronization with signal delivery to the encoding unit 140, but the present invention is not limited thereto. Further, the above process in the processing unit 138 is performed, for example, when the communication apparatus 100 plays a role of a transmission apparatus. The transmission request according to the process in the processing unit 138 may include, for example, the RTS packet at 60 GHz shown in FIG. 7, but the present invention is not limited thereto. Here, the transmission request according to the process in the processing unit 138 corresponds to the second transmission request in the other communication apparatus 100 constituting the communication system 1000.

Further, the processing unit 138, for example, transmits the requested beam pattern identification information based on the requested beam pattern determined by the requested beam pattern determining unit 146 to an external apparatus having transmitted the second transmission request via the first communication processing unit 122. The process in the processing unit 138 is performed, for example, when the communication apparatus 100 plays a role of a reception apparatus.

Here, an external apparatus having transmitted the second transmission request, to which the processing unit 138 has transmitted the requested beam pattern identification information, corresponds to an external apparatus having transmitted the second transmission request that the requested beam pattern determining unit 146 uses to determine the requested beam pattern.

Further, the configuration in which the second communication processing unit 124 includes the requested beam patterns determining unit 146 and the processing unit 138 that are separate entities is shown in FIG. 12, but the present invention is not limited thereto. For example, in the second communication processing unit 124 according to an embodiment of the present invention, the processing unit 138 may play a role of the requested beam pattern determining unit 146 which will be described below.

The processing unit 138 performs, for example, the process as described above, as signal processing. Further, the signal processing in the processing unit 138 is not limited thereto.

The encoding unit 140 performs, for example, modulation or mapping based on the signal delivered from the processing unit 138. Here, a modulation scheme in fee decoding unit 136 may include, for example, an OFDM modulation scheme, but the present invention is not limited thereto.

The beam pattern application unit 142 selectively weights the signal to be transmitted from the second communication unit 104 and sets directivity (or non-directivity) in the signal to be transmitted from the second communication unit 104. Here, weighting the signal in the beam pattern application unit 142 may include, for example, complex multiplication of a weight coefficient (a complex number) corresponding to the transmission beam pattern to be applied to the signal.

Further, the beam pattern application unit 142 may multiply a signal to be transmitted by a weight coefficient corresponding to the requested beam pattern identification information transmitted from an external apparatus (application of the requested beam pattern based on the requested beam pattern identification information. Here, the requested beam pattern identification information delivered to the beam pattern application unit 142 is, for example, delivered from the first communication processing unit 122, based on the CTS packet having the first frequency, shown in FIG. 2, received by the first communication unit 102. Further, the beam pattern application unit 142 acquires the weight coefficient, corresponding to the requested beam pattern identification information, for example, by referencing a beam pattern storage unit (not shown), but a method of acquiring the weight coefficient corresponding to the requested beam pattern identification information in the beam pattern application unit 142 is not limited thereto. The beam pattern application unit 142 multiplying the signal to be transmitted by the weight coefficient corresponding to the requested beam pattern identification information enables the communication apparatus 200 to transmit the carrier f2 having the second frequency to which a transmission beam pattern desired by an external apparatus has been applied.

The reception intensity derivation unit 144 derives reception intensity for each transmission beam pattern based on the second transmission request delivered from the automatic gain control unit 132 and the AGC setting value set in the second transmission request held in the setting value storage unit 134. Here, the reception intensity derivation unit 144 derives the AGC setting value (or an adjustment value corresponding to the AGC setting value), e.g., the adjusted reception intensity, but a method of deriving the adjusted reception intensity in the reception intensity derivation unit 144 is not limited thereto. Further, the reception intensity derivation unit 144 may selectively derive the reception intensity, for example, based on the signal indicating that the second transmission request delivered from the synchronization unit 130 has been received.

The requested beam pattern determining unit 146 determines the requested beam pattern based on the derivation result from the reception intensity derivation unit 144.

Further, the requested beam pattern determining unit 146 delivers, to the setting value storage unit 134, the AGC setting value set tor the transmission beam pattern corresponding to the determined requested beam pattern among the AGC setting values set in the second transmission request.

The second communication processing unit 124 processes the second reception signal delivered from the second communication unit 104 and transmits the second transmission signal to the second communication unit 104, for example, by having the configuration shown in FIG. 12. Further, the second communication processing unit 124, for example, performs the above-described communication process in conjunction with the first communication processing unit 122 by having the configuration shown in FIG. 12.

[Modified Example of Second Signal Processing Unit According to First Embodiment]

Figure 13:
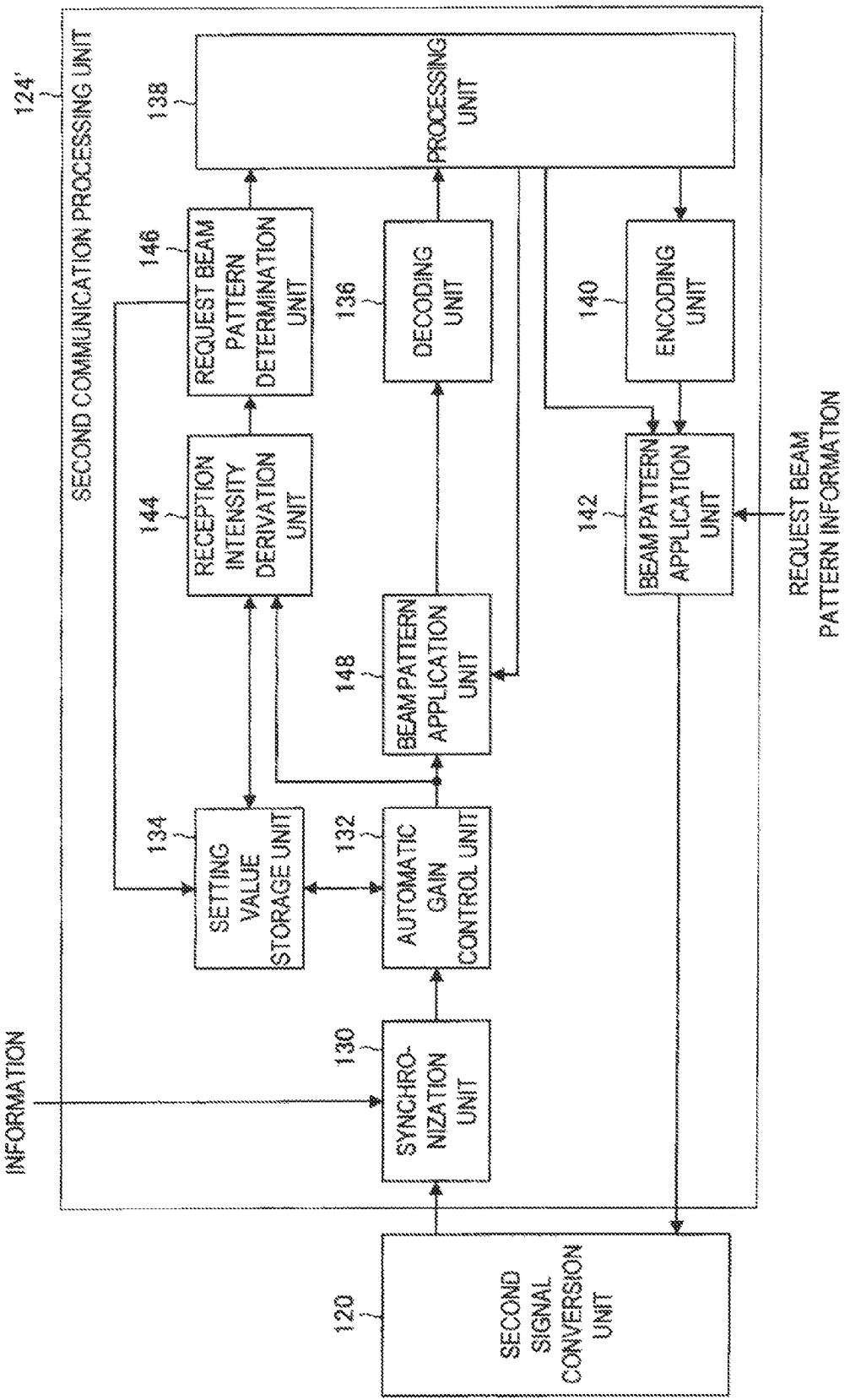
FIG. 13 is an illustrative diagram showing an example of a configuration of a second communication processing unit according to a modified example of the first embodiment of the present invention.

Further, a configuration of the second communication processing unit 124 according to the first embodiment of the present invention Is not limited to the configuration shown in FIG. 12. FIG. 13 is an illustrative diagram showing an example of a configuration of a second communication processing unit 124' according to a modified example of the first embodiment of the present invention.

Referring to FIG. 13, the second communication processing unit 124' basically has the same configuration as the second communication processing unit 124 shown in FIG. 12, but further includes a beam pattern application unit 148 before the decoding unit 136.

The beam pattern application unit 148 weights a signal delivered from the automatic gain control unit 132 to set directivity (or non-directivity) in the signal. Here, weighting the signal in the beam pattern application unit 148 may include, for example, complex multiplication of a weight coefficient (corresponding to the requested beam pattern complex number) corresponding to the requested beam pattern.

The second communication processing unit 124' may apply a reception beam pattern to the second reception signal received by the second communication unit 104 by including the beam pattern application unit 148. Accordingly, the second communication processing unit 124' can obtain a greater gain than the second communication processing unit 124 shown in FIG. 12.

Further, since the second communication processing unit 124' basically has the same configuration as the second communication processing unit 124 shown in FIG. 12, the second communication processing unit 124' can realize the same function as the second communication processing unit 124 shown in FIG. 12.

The control unit 106 can realize the first approach described above and the communication process according to an embodiment of the present invention by including the first communication processing unit 122 and the second communication processing unit 124 (or the second communication processing unit 124').

The communication apparatus 100, for example, can realize the above-described automatic gain control approach (the first approach) according to an embodiment of the present invention and the communication process according to an embodiment of the present invention, by means of the configuration shown in FIG. 10.

As described above, the communication apparatus 100 according to the first embodiment performs the automatic gain control on each transmission beam pattern based on the AGC setting value corresponding to each transmission beam pattern included in the second transmission request transmitted by the carrier f2 having the second frequency. Accordingly, since the communication apparatus 100 can process a packet having substantially single directivity despite a great dynamic range of the second received transmission request, it is possible to prevent generation of data outside the measurement range. Accordingly, the communication apparatus 100 can process a packet having a wide dynamic range in communication using the directivities of the antennas.

Further, since the communication apparatus 100 can process a packet having a wide dynamic range, a communication process capable of achieving stability of communication using the directivities of the antennas according to an embodiment of the present invention can be realized.

(Communication Apparatus According to Second Embodiment)

Figure 14:
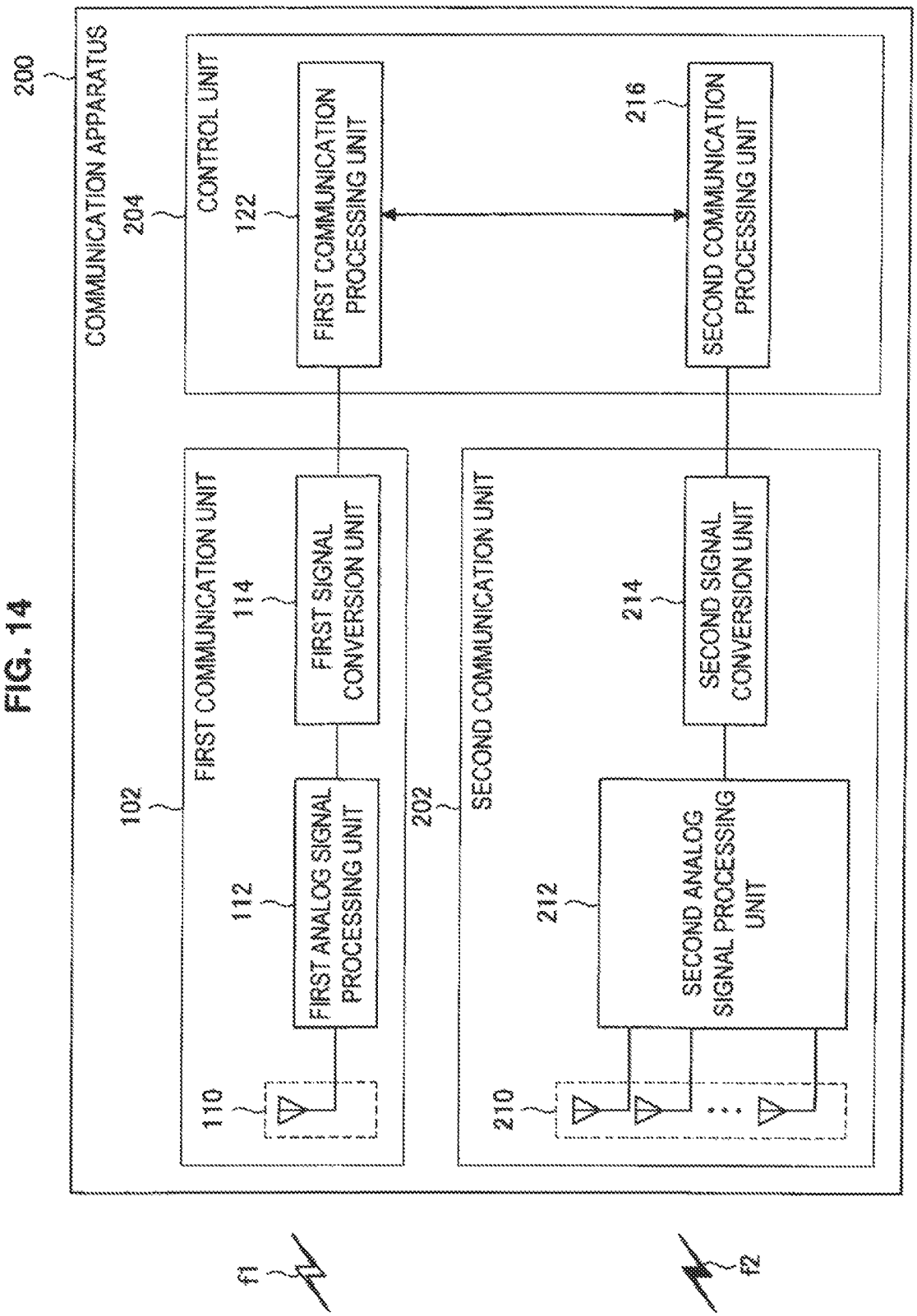
FIG. 14 is an illustrative diagram showing an example of a configuration of a communication apparatus according to a second embodiment of the present invention.

Next, the communication apparatus 200 capable of realizing the above-described approach (2) (the second approach) according to a second embodiment of the present invention will be described. FIG. 14 is an illustrative diagram showing an example a configuration of the communication apparatus 200 according to the second embodiment of the present invention.

The communication apparatus 200 includes a first communication unit 102, a second communication unit 202, and a control unit 204. Further, the communication apparatus 200 may include, for example, a ROM (not shown), a RAM (not shown), a storage unit (not shown), a manipulation unit (not shown), a display unit (not shown) and the like. In the communication apparatus 200, for example, the respective components may be connected by a bus, as a data transmission line.

The first communication unit 102 is a first communication means included in the communication apparatus 200, and performs wireless communication with an external apparatus using the carrier f1 having the first frequency. Further, the first communication unit 102 has the same function and configuration as the first communication unit 102 shown in FIG. 11.

The second communication unit 202 is a second communication means included in the communication apparatus 200, and performs wireless communication with an external apparatus using the carrier f2 having the second frequency. Further, the second communication unit 202 includes a second communication antenna 210, a second analog signal processing unit 212, and a second signal conversion unit 214.

The second communication antenna 210, the second analog signal processing unit 212, and the second signal conversion unit 214 basically have the same function and configuration as the second communication antenna 116, the second analog signal processing unit 118, and the second signal conversion unit 120 shown in FIG. 11.

Here, a difference between the second communication unit 202 and the second communication unit 104 shown in FIG. 11 according to the first embodiment is that the respective components of the second communication unit 202 are grouped. For example, when the second communication antennas 210 are divided into three groups, the second analog signal processing unit 212 and the second signal conversion unit 214 have three signal processing systems corresponding to the respective groups. Here, for example, when the second communication antenna 210 includes 30 communication antennas, the communication apparatus 200 groups the communication antennas uniformly in number, but the present invention is not limited thereto. For example, the communication apparatus 200 groups the communication antennas differently in number, e.g., 10, 15 and 5.

Hereinafter, the communication apparatus 200 will be described as including the second communication unit 202 having a configuration its which consumption antennas are divided into three groups. Further, it is understood that the grouping according to an embodiment of the present invention is not limited to three groups.

The control unit 204 includes, for example, an MPU or an integrated circuit having various processing circuits integrated therein, and controls the entire communication apparatus 200. Further, the control unit 204 includes a first communication processing unit 122 and a second communication processing unit 216, and plays a leading role of performing the above-described communication process according to an embodiment of the present invention.

The first communication processing unit 122 has the same function and configuration as the first communication processing unit 122 shown in FIG. 11.

The second communication processing unit 216 processes the second reception signal delivered for each group from the second communication unit 202 and transmits the second transmission signal for each group to the second communication unit 202. Here, the second communication processing unit 216 may perform the process in conjunction with the first communication processing unit 122, similar to the second communication processing unit 124 shown in FIG. 11.

[Example of Configuration of Second Communication Processing Unit 216]

Figure 15:
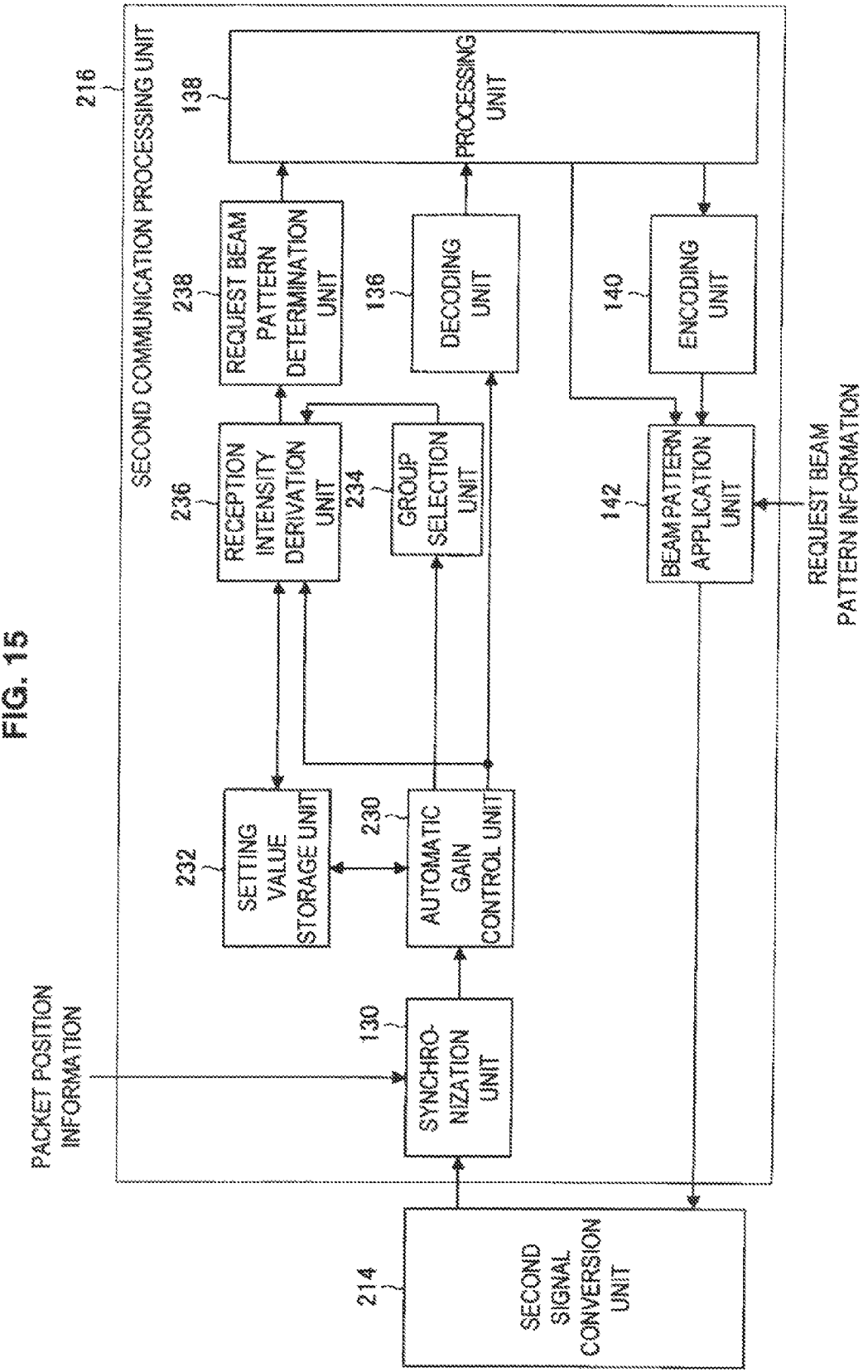
FIG. 15 is an illustrative diagram showing an example a configuration of a second communication processing unit according to the second embodiment of the present invention.

Here, a configuration of the second communication processing unit 216 will be described in greater detail. FIG. 15 is an illustrative diagram showing an example of the configuration of the second communication processing unit 216' according to the second embodiment of the present invention. In FIG. 15, the second signal conversion unit 214 constituting the second communication unit 202 is also shown.

The second communication processing unit 124 includes a synchronization unit 130, an automatic gain control unit 230, a setting value storage unit 232, a decoding unit 136, a processing unit 138, an encoding unit 140, a beam pattern application unit 142, a group selection unit 234, a reception intensity derivation unit 236, and a requested beam pattern determining unit 238. Here, the second communication processing unit 216 may further include a beam pattern storage unit (not shown) in which information of a transmission beam pattern for being applied to a signal to be transmitted to an external apparatus is stored.

The synchronization unit 130, the decoding unit 136, the processing unit 138, the encoding unit 140, and the beam pattern application unit 142 have the same function and configuration as the corresponding components shown in FIG. 12.

The automatic gain control unit 230 includes an AGC circuit corresponding to each group, and adjusts a gain of a signal delivered for each group (a signal corresponding to the second reception signal). Here, each AGC circuit constituting the automatic gain control unit 230 adjusts the gain of the delivered signal based on a different AGC setting value (a third automatic gain control setting value) for each AGC circuit stored in the setting value storage unit 232 in advance.

Further, each AGC circuit constituting the automatic gain control unit 230 performs automatic gain control using the AGC setting value stored in the setting value storage unit 232 as a fixed value, but an AGC setting value used for the automatic gain control by each AGC circuit constituting the automatic gain control unit 230 is not limited thereto. For example, each AGC circuit constituting the automatic gain control unit 230 may use the AGC setting value stored in the setting value storage unit 232 as an initial value of the automatic gain control.

Further, each AGC circuit constituting the automatic gain control unit 230 includes, for example, an LNA for performing switching of a great gain or a VGA for performing switching of a smaller gain, but the present invention is not limited thereto.

The setting value storage unit 232 for storing the AGC setting value (a third automatic gain control setting value) for each AGC circuit constituting the automatic gain control unit 230 includes, for example, a nonvolatile memory such as a flash memory as a recording medium for storing the AGC setting value, but the recording medium included in the setting value storage unit 232 is not limited thereto.

The group selection unit 234 selects one group based on reception intensity of a signal tor each group delivered from the automatic gain control unit 230. The group selection unit 234 delivers information of the selection result (e.g., an index number indicating the group) to the reception intensity derivation unit 236.

Further, a configuration in which the group selection unit 234 delivers the selection result information to the reception intensity derivation unit 236 is shown in FIG. 15, but a target to which the group selection unit 234 delivers the selection result information is not limited thereto. For example, the group selection unit 234 according to an embodiment of the present invention may also deliver the selection result information to the processing unit 138. The delivery of the selection result information enables the processing unit 138 to selectively process a signal corresponding to a group indicated by the selection result information among the signals for the groups delivered from the decoding unit 136.

The reception intensity derivation unit 236 selectively processes one second transmission request among the second transmission requests for the groups delivered from the automatic gain control unit 230 based on the selection result information delivered from the group selection unit 234. More specifically, the reception intensity derivation unit 236 derives reception intensity for each transmission beam pattern based on the second transmission request corresponding to fee group indicated by the selection result information and the AGC setting value stored in the setting value storage unit 232.

Further, the reception intensity derivation unit 236 may selectively derive the reception intensity, for example, based on the signal indicating that the second transmission request delivered from the synchronization unit 130 has been received.

The requested beam pattern determining unit 238 determines the requested beam pattern based on the derivation result from the reception intensity derivation unit 236.

The second communication processing unit 216, for example, processes the second reception signal for each group delivered from the second communication unit 202 and transmits the second transmission signal for each group to the second communication unit 202 by having the configuration shown in FIG. 15. Further, the second communication processing unit 216, for example, performs the above-described communication process in conjunction with the first communication processing unit 122 by having the configuration shown in FIG. 15.

[Modified Example of Second Signal Processing Unit According to Second Embodiment]

Further, a configuration of the second communication processing unit 216 according to the second embodiment of the present invention is not limited, to the configuration shown in FIG. 15. FIG. 16 is an illustrative diagram showing an example of a configuration of the second communication processing unit 216' according to a modified example of the second embodiment of the present invention.

Referring to FIG. 16, the second communication processing unit 216' basically has the same configuration as the second communication processing unit 216 shown in FIG. 15, but further includes a beam pattern application unit 240 before the decoding unit 136 and the group selection unit 234.

The beam pattern application unit 240 weights a signal for each group delivered from the automatic gain control unit 230, and sets directivity (or non-directivity) in the signal. Here, weighting the signal in the beam pattern application unit 240 may include, for example, complex multiplication of a weight coefficient (complex number) corresponding to the requested beam pattern.

The second communication processing unit 216' may apply a reception beam pattern to the second reception signal for each group received by the second communication unit 104 by including the beam pattern application unit 240. Accordingly, the second communication processing unit 216' can obtain a greater gain compared to the second communication processing unit 216 shown in FIG. 15.

Further, since the second communication processing unit 216' basically has the same configuration as the second communication processing unit 216 shown in FIG. 15, the second communication processing unit 216' can realize the same function as the second communication processing unit 216 shown in FIG. 15.

The control unit 204 can realize the second approach described above and the communication process according to the embodiment of the present invention by including the first communication processing unit 122 and the second communication processing unit 216 (or the second communication processing unit 216').

The communication apparatus 200 can realize, for example, the above-described automatic gain control approach (the second approach) according to the embodiment of the present invention and the communication process according to the embodiment of the present invention, by using the configuration shown in FIG. 14.

As described above, the communication apparatus 200 according to the second embodiment divides a plurality of antennas into a plurality of groups, and includes a plurality of AGC circuits corresponding to the groups. Further, the communication apparatus 200 sets a different AGC setting value (the third automatic gain control setting value) for each AGC circuit corresponding to the group. Here, setting the different AGC setting value in the AGC circuit corresponding to each group enables the communication apparatus 200 to cover an entire range (or wide range) of the reception intensity to be processed in the communication by the carrier f2 having the second frequency. Thus, the communication apparatus 200 can determine the requested beam pattern from among the plurality of transmission team patterns based on the second transmission request output from the AGC circuit corresponding to any group irrespective of the dynamic range of the second transmission request. Accordingly, the communication apparatus 200 can process a packet having a wide dynamic range in communication using the directivity of the antenna.

Further, since the communication apparatus 200 can process a packet having a wide dynamic range, a communication process capable of achieving stability of communication using the directivities of the antennas according to an embodiment of the present Invention can be realized.

While the communication apparatus 100 and the communication apparatus 200 have been described by way of example as the embodiments of the present invention, the embodiment of the present invention is not limited to such forms. The embodiment of the present invention may be applied to, for example, various apparatuses having a communication function, such as a computer such as a PC, a portable communication apparatus such as a portable telephone, and a portable game machine.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

REFERENCE SIGNS LIST 100, 100A, 100B, 100C, 200 communication apparatus
102 first communication unit
104, 202 second communication unit
106, 204 control unit
110 first communication antenna
112 first analog signal processing unit
114 first signal conversion unit
116, 210 second communication antenna
118, 212 second analog signal processing unit
120, 214 second signal conversion unit
122 first communication processing unit
124, 124', 216, 216' second communication processing unit
130 synchronization unit
132, 230 automatic gain control unit
134, 232 setting value storage unit
136 decoding unit
138 processing unit
140 encoding unit
142, 148, 240 beam pattern application unit
144, 236 reception intensity derivation unit
146, 238 requested beam pattern determining unit
234 group selection unit
1000 communication system

The invention claimed is:

1. An electronic device comprising:
a plurality of antennas; and
circuitry configured to:
  control performing wireless communication using a first frequency;
  control performing wireless communication using a second frequency, the second frequency higher than the first frequency;
  identify a start position of a second received signal including a beam training field based on a synchronization information, the synchronization information based on a first received signal, wherein the first received signal is received via the first frequency and the second received signal is received via the second frequency; and
  conduct gain control for beam patterns indicated by the beam training field included in the identified second received signal via the plurality of antennas.

2. A communication apparatus comprising:
a plurality of antennas; and
circuitry configured to:
  control performing wireless communication using a first frequency via a first antenna of the plurality of antennas;
  control performing wireless communication using a second frequency via at least a second antenna of the plurality of antennas, the second frequency higher than the first frequency;
  identify a start position of a second received signal including a beam training field based on a synchronization information, the synchronization information based on a first received signal, wherein the first received signal is received via the first frequency and the second received signal is received via the second frequency; and
  conduct gain control for beam patterns indicated by the beam training field included in the identified second received signal.

3. The electronic device of claim 1, wherein the second signal is received with a predetermined no signal period.

4. The electronic device of claim 3, wherein the beam training field includes a plurality of beam patterns, and the predetermined no signal period is set between the plurality of beam patterns.

5. The communication apparatus of claim 2, wherein the second signal is received with a predetermined no signal period.

6. The communication apparatus of claim 5, wherein the beam training field includes a plurality of beam patterns, and the predetermined no signal period is set between the plurality of beam patterns.

* * * * *